(12) United States Patent
Okawa et al.

(10) Patent No.: US 7,099,697 B2
(45) Date of Patent: Aug. 29, 2006

(54) BASE STATION, MOBILE COMMUNICATION SYSTEM, AND COMMUNICATION METHOD

(75) Inventors: Koichi Okawa, Yokohama (JP); Shinya Tanaka, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 175 days.

(21) Appl. No.: 10/644,809

(22) Filed: Aug. 21, 2003

(65) Prior Publication Data

US 2004/0038713 A1   Feb. 26, 2004

(30) Foreign Application Priority Data

Aug. 23, 2002  (JP) .............................. 2002-244281

(51) Int. Cl.
*H04M 1/00* (2006.01)
(52) U.S. Cl. ............................. 455/562.1; 455/575.7; 455/25; 455/82; 455/63.4
(58) Field of Classification Search ................. 455/25, 455/63.4, 82, 562.1, 575.7, 121, 129, 101, 455/13.3, 19, 406; 342/367, 368, 354
See application file for complete search history.

(56) References Cited

U.S. PATENT DOCUMENTS

| 4,723,266 A | 2/1988 | Perry |
| 5,564,121 A | 10/1996 | Chow et al. |
| 5,953,325 A | 9/1999 | Willars |

FOREIGN PATENT DOCUMENTS

| EP | 0 540 387 | 5/1993 |
| EP | 0 777 400 | 6/1997 |
| EP | 0 812 026 | 12/1997 |
| EP | 0 926 843 | 6/1999 |
| JP | 10-173585 | 6/1998 |
| JP | 11-289287 | 10/1999 |
| WO | WO 98/29965 | 7/1998 |

OTHER PUBLICATIONS

S. Tanak, et al., IEICE Transactions on Fundamentals of Electronics, Communications and Computer Sciences, vol. E80-A, No. 12, pp. 2445-2454, "Pilot Symbol-Assisted Decision-Directed Coherent Adaptive Array Diversity for DS-CDMA Mobile Radio Reverse Link", Dec. 1997.

H. Taoka, et al., IEEE Wireless Communications, pp. 34-41, "Adaptive Antenna Array Transmit Diversity in FDD Forward Link for W-CDMA and Broadband Packet Wireless Access", Apr. 2002.

*Primary Examiner*—Joseph Feild
*Assistant Examiner*—Huy D. Nguyen
(74) *Attorney, Agent, or Firm*—Oblon, Spivak, McClelland, Maier & Neustadt, P.C.

(57) ABSTRACT

A base station comprises a directional antenna configured to transmit a directional beam to a mobile station, an omnidirectional antenna configured to transmit an omnidirectional beam to the mobile station, and an antenna controller configured to determine whether or not the mobile station is capable of receiving the directional beam, and select the directional antenna as an antenna for transmitting individual data in a case of being capable of receiving the directional beam, or select the omnidirectional antenna as an antenna for transmitting the individual data in a case of being incapable of receiving the directional beam.

7 Claims, 13 Drawing Sheets

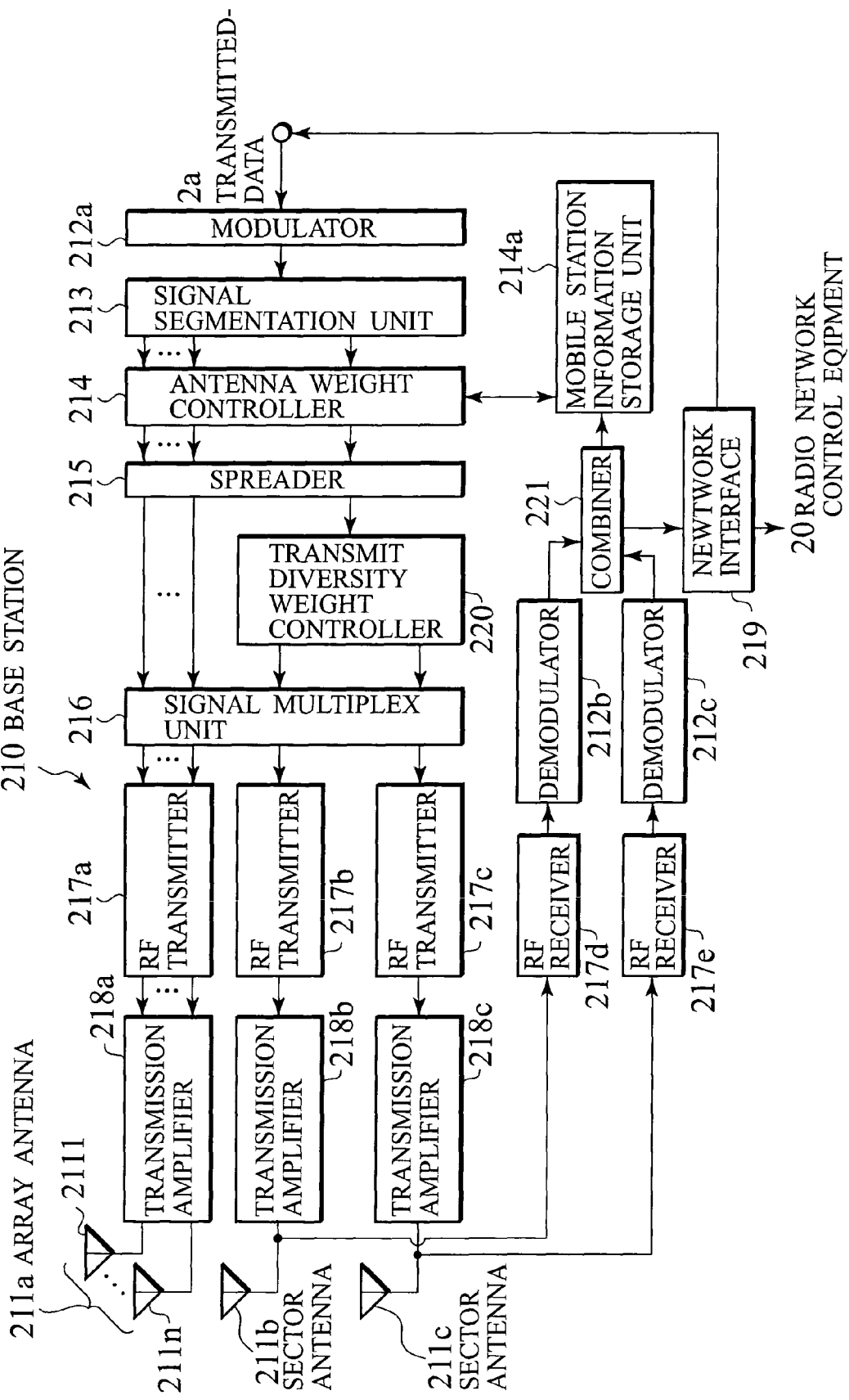

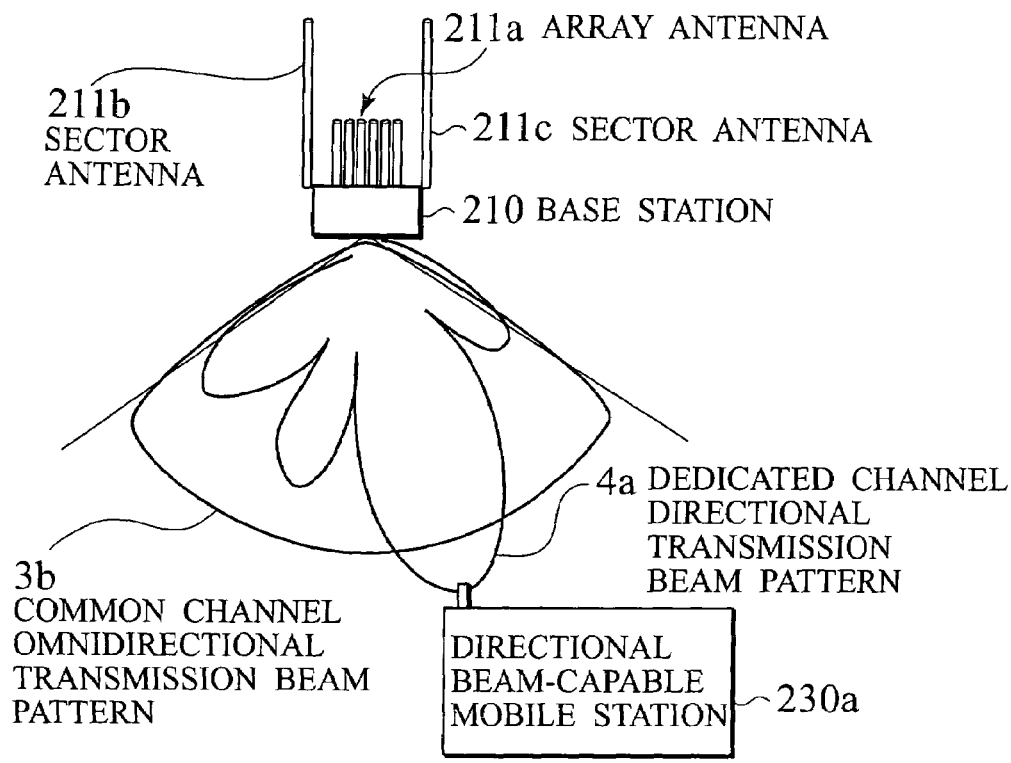
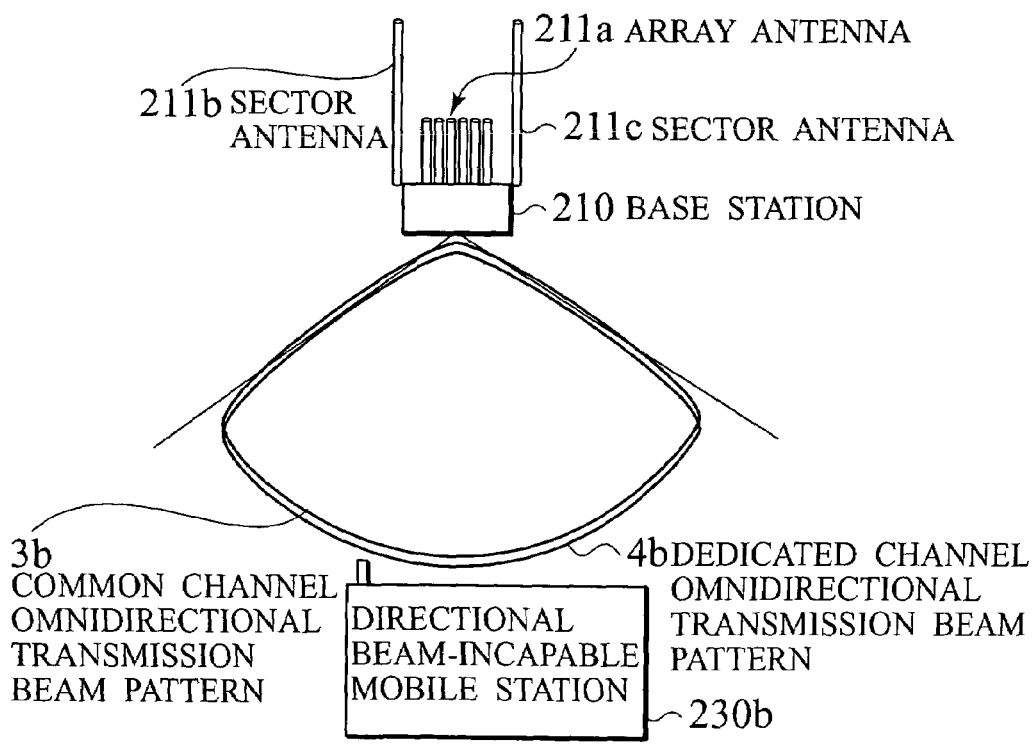

BASE STATION, MOBILE COMMUNICATION SYSTEM, AND COMMUNICATION METHOD

CROSS REFERENCE TO RELATED APPLICATIONS

This application is based upon and claims the benefit of priority from the prior Japanese Patent Application No. P2002-244281, filed on Aug. 23, 2002; the entire contents of which are incorporated herein by reference.

BACKGROUND OF THE INVENTION

1. Field of the Invention

The present invention relates to a base station, a mobile communication system, and a communication method.

2. Description of the Related Art

Conventionally, a mobile communication system adopts a cellular system, which covers service areas two-dimensionally by arranging a plurality of base stations to form a plurality of cells. In addition, the mobile communication system adopts a sector-cell structure that covers the service area by dividing a cell into a plurality of sectors and placing antennas for each sector on the base stations. In the mobile communication system, directional beam reception/transmission techniques using adaptive antenna array diversity are adopted, in order to suppress the interference power from other mobile stations. Adaptive antenna array diversity is a technique for adaptive reception of a base station in an uplink and adaptive transmission of a base station in a downlink.

In the uplink, adaptive antenna array receive diversity is performed. This is a technique where a base station performs directional beam reception by receiving data from mobile stations with a plurality of antennas, multiplying appropriate weights to the signals received by respective antennas, and combining them. For example, a coherent adaptive antenna array diversity reception method using pilot symbols in a radio access referred to as direct sequence code division multiple access (DS-CDMA) has been proposed (for example, 'Pilot Symbol-Assisted Decision-Directed Coherent Adaptive Array Diversity For DS-CDMA Mobile Radio Reverse Link', S. Tanaka, M. Sawahashi, and F. Adachi; IEICE Trans. Fundamentals, vol. E80-A, pp. 2445–2454, December 1997).

In addition, in the downlink, adaptive antenna array transmit diversity is performed. For example, a method has been proposed as the adaptive antenna array transmit diversity where a base station performs directional beam transmission after performing compensation for amplitude/phase variance occurring in a radio link of a beam pattern formed in the uplink (for example, 'Adaptive Antenna Array Transmit Diversity In FDD Forward Link For WSDMA And Broadcast Packet Wireless Access', H. Taoka, S. Tanaka, T. Ihara, and M. Sawahashi; IEEE Wireless Communications, pp. 2–10, April 2002).

The mobile communication system reduces the interference power from mobile stations existing in the same sector, another sector, or another cell by adopting such adaptive antenna array diversity. FIG. 1 is a diagram illustrating a configuration of a base station 310, which performs directional beam reception/transmission that adopts such adaptive antenna array diversity. FIG. 1 shows a case where a cell is divided into three sectors: a first sector, a second sector, and a third sector. The base station 310 has a first sector array antenna 311a, a second sector array antenna 311b, and a third sector array antenna 311c for transmitting a directional beam to respective sectors.

The base station 310 then transmits a downlink channel to mobile stations by using the first sector array antenna 311a, the second sector array antenna 311b, and the third sector array antenna 311c, respectively. The downlink channel includes a dedicated channel, which transfers individual data such as individual information data of each mobile station, and a common channel, which transfers common data such as control data common to a plurality of mobile stations.

As shown in FIG. 2A, the base station 310 transmits the dedicated channel with a directional beam, by using the array antenna 311. For example, the base station 310 transmits abeam to a mobile station 320a of a user #1 by narrowing the beam so as to form a transmission beam pattern 304a for the user No. 1. Similarly, the base station 310 transmits a beam to a mobile station 320b of a user #2 by narrowing the beam so as to form a transmission beam pattern 304b for the user #2. As a result, the interference power between the mobile stations 320a and 320b may be decreased.

Meanwhile, in the case of transmitting a common channel, the base station 310 transmits the common channel with an omnidirectional beam, by using the array antenna 311 so as to form a common channel omnidirectional beam pattern 305 as shown in FIG. 2B. This aims to enable all mobile stations 320a and 320b in the sector to receive the common channel. There are two conventional methods for transmitting a downlink common channel with the omnidirectional beam, by using the array antenna 311 so as to cover the entire sector. A first conventional method is a method where an antenna weight for a plurality of antenna elements configuring the array antenna 311 is determined so as to form an omnidirectional beam pattern that covers the entire sector. A second conventional method is a method where omnidirectional beam transmission is performed using only one of the antenna elements configuring the array antenna 311.

In addition, a method has been proposed where a base station has an omnidirectional antenna and a directional antenna, transmits common information such as a control signal using the omnidirectional antenna, and transmits the directional beam for subsequent communications, by using the directional antenna (Japanese Patent Laid-Open No. Hei 11-289287, and Japanese Patent Laid-Open No. Hei 10-173585).

However, with the first conventional method, beam gain varies depending on the angle of beam transmission, and a drop in beam gain occurs. Therefore, saturation power of a transmission amplifier must be increased to compensate for the drop in beam gain. In addition, with the second conventional method, antenna gain becomes 1/the total number of the antenna elements configuring the array antenna 311, because only one antenna element is used for transmission. More specifically, since the array antenna is configured by arranging a plurality of the antenna elements, the length of antenna elements is shorter than that of the sector antenna. This is because there is a restriction in wind pressure given to an antenna in proportion to the cross sectional area of the antenna, and the length of antenna elements must be shortened as the number of antenna elements increases. Since the base station transmits the omnidirectional beam, by using only one of such short antenna elements, antenna gain is further decreased. Therefore, the saturation power of the transmission amplifier must be increased in order to cover the entire sector. As a result, the equipment scale of the base station has increased in both cases of the first conventional method and the second conventional method.

In addition, mobile stations include those capable and those incapable of receiving a directional beam. Therefore, there is the following problem even with the method where a base station having an omnidirectional antenna and a directional antenna transmits common information such as a control signal using the omnidirectional antenna, and transmits the directional beam for subsequent communications using the directional antenna. In the case of transmitting a dedicated channel, the base station transmits the dedicated channel with the directional beam using a directional antenna regardless of the type of mobile station. Therefore, the base station transmits the directional beam using a directional antenna for even the mobile station that is incapable of receiving a directional beam. Accordingly, the mobile station incapable of receiving a directional beam cannot receive signals appropriately.

BRIEF SUMMARY OF THE INVENTION

The object of the present invention is to enable a mobile station to receive signals appropriately, and reduce the equipment scale of a base station.

A mobile communication system of the present invention comprises a mobile station and a base station. The base station comprises a directional antenna configured to transmit a directional beam to the mobile station, an omnidirectional antenna configured to transmit an omnidirectional beam to the mobile station, and an antenna controller configured to determine whether or not the mobile station is capable of receiving the directional beam, and select the directional antenna as an antenna for transmitting individual data in the case of being capable of receiving the directional beam, or select the omnidirectional antenna as an antenna for transmitting individual data in the case of being incapable of receiving the directional beam. Individual data refers to data individual to each mobile station.

According to the mobile communication system and the base station, the base station comprises both the directional antenna, which transmits the directional beam to the mobile station, and the omnidirectional antenna, which transmits the omnidirectional beam to the mobile station. In addition, the antenna controller determines whether or not the mobile station is capable of receiving a directional beam. The antenna controller then selects the directional antenna as an antenna to be used for transmitting individual data when the mobile station is capable of receiving a directional beam. Meanwhile, the antenna controller selects the omnidirectional antenna as an antenna to be used for transmitting individual data when the mobile station is incapable of receiving a directional beam. Accordingly, the base station can switch the antenna to be used for transmitting individual data according to the type of mobile station. As a result, the base station may transmit signals appropriately, according to the type of mobile station, and the mobile station may receive signals appropriately.

More specifically, the base station can transmit a dedicated channel to the mobile station capable of receiving a directional beam with a directional beam, by using the directional antenna. Accordingly, the base station can improve beam gain, and the saturation power of the transmission amplifier can be reduced. In addition, the base station can transmit the dedicated channel to the mobile station incapable of receiving a directional beam with an omnidirectional beam, by using the omnidirectional antenna. Accordingly, the base station can prevent an increase in the saturation power of the transmission amplifier when transmitting the omnidirectional beam using the directional antenna as with the first conventional method and the second conventional method. As a result, the equipment scale of the base station may be reduced.

A communication method of the present invention comprises determining whether or not a mobile station is capable of receiving a directional beam, selecting a directional antenna as an antenna for transmitting individual data in the case of being capable of receiving the directional beam, or an omnidirectional antenna as an antenna for transmitting the individual data in the case of being incapable of receiving the directional beam, and transmitting the individual data to the mobile station by using either the directional antenna or the omnidirectional antenna.

According to the communication method, to begin with, the base station determines whether or not the mobile station is capable of receiving a directional beam. The base station then selects the directional antenna as an antenna to be used for transmitting the individual data when the mobile station is capable of receiving a directional beam, and transmits the individual data to the mobile station. Meanwhile, the base station selects the omnidirectional antenna as an antenna to be used for transmitting the individual data when the mobile station is incapable of receiving a directional beam, and transmits the individual data to the mobile station. Accordingly, the base station can switch the antenna to be used for transmitting the individual data according to the type of mobile station. As a result, the base station may transmit signals appropriately, according to the type of mobile station, and the mobile station may receive signals appropriately. Furthermore, the base station can prevent an increase in the saturation power of the transmission amplifier when transmitting the omnidirectional beam using the directional antenna as with the first or the second conventional method. As a result, the equipment scale of the base station may be reduced.

BRIEF DESCRIPTION OF THE SEVERAL VIEWS OF THE DRAWINGS

FIG. 10 is a diagram illustrating a configuration of a transmission system of the base station according to the second embodiment of the present invention;

FIGS. 11A and 11B are diagrams illustrating beam patterns transmitted from the base station according to the second embodiment of the present invention;

DETAILED DESCRIPTION OF THE INVENTION

[First Embodiment]

(Mobile Communication System)

Figure 1:
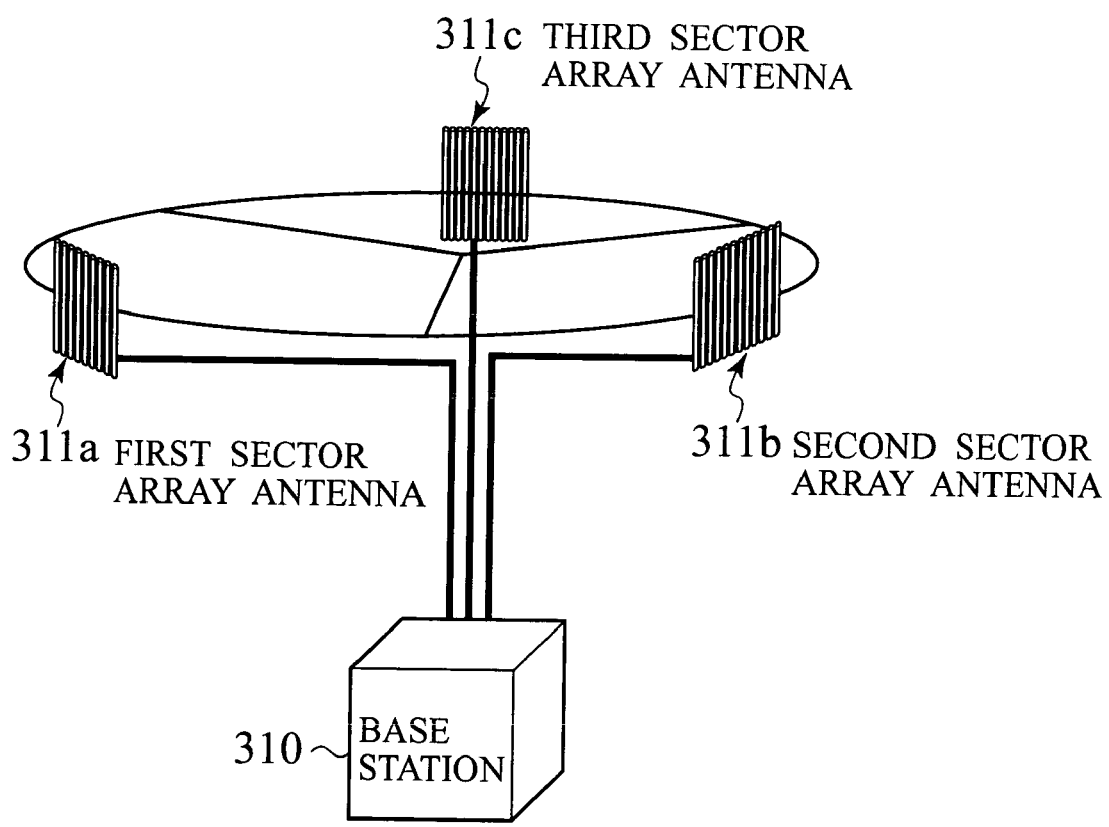
FIG. 1 is a diagram illustrating a configuration of a conventional base station.
Figure 2A:
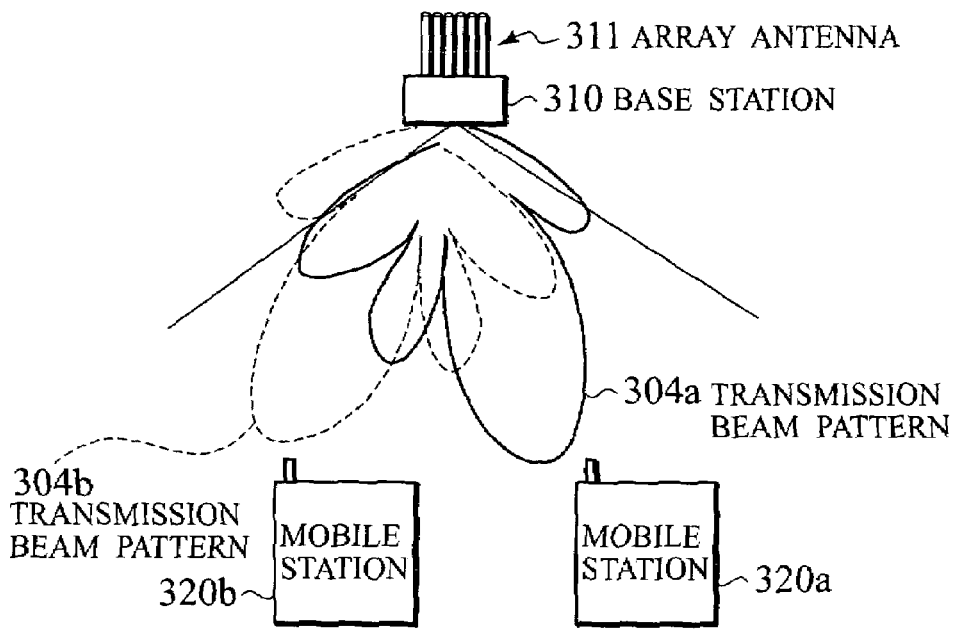
FIGS. 2A and 2B are diagrams illustrating beam patterns transmitted from the conventional base station.
Figure 2B:
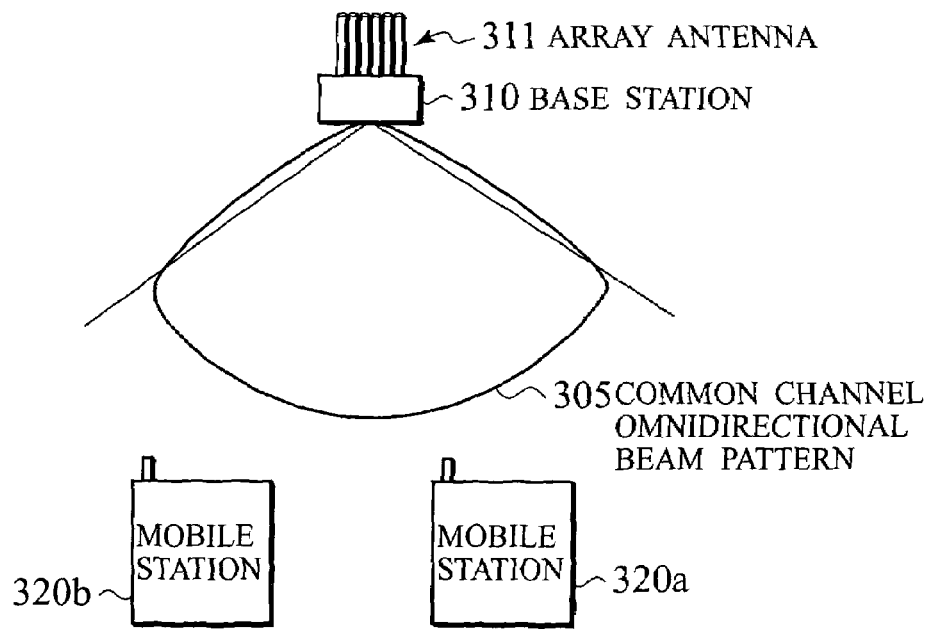
Figure 3A:
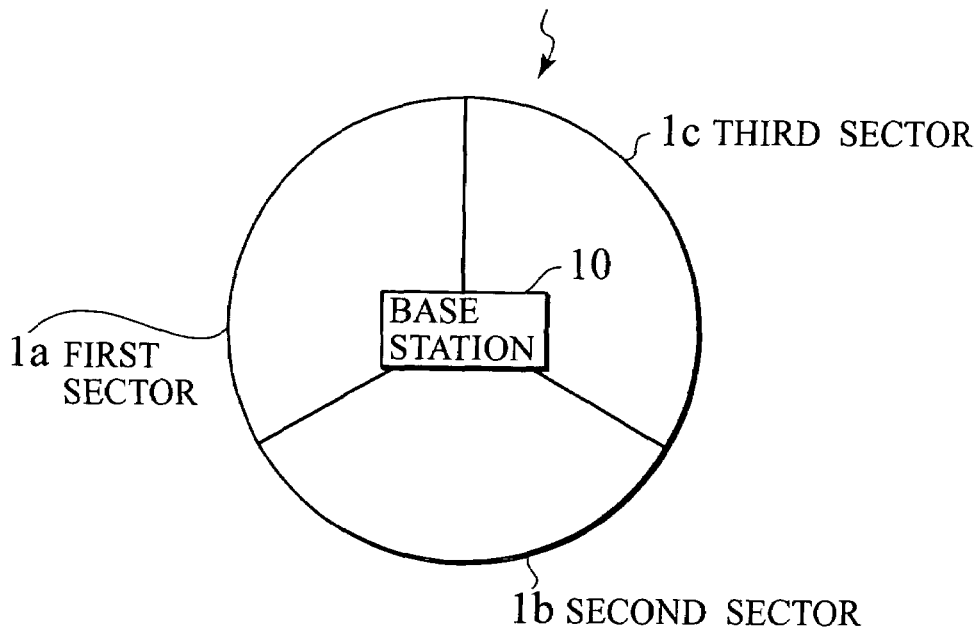
FIGS. 3A and 3B are diagrams illustrating a sector-cell structure according to a first embodiment of the present invention.
Figure 3B:
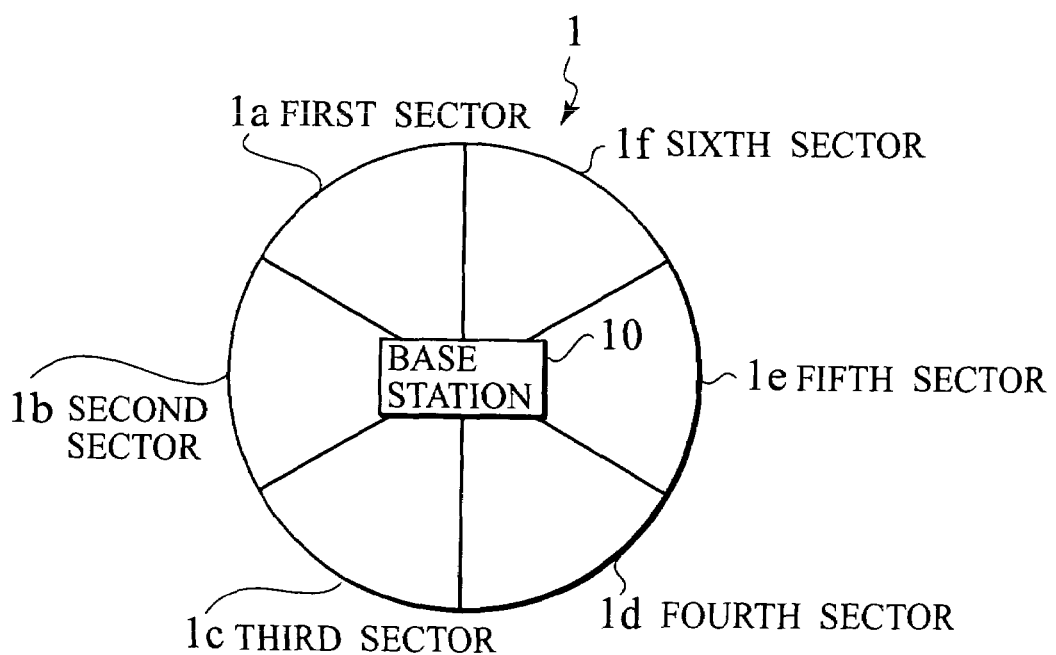

As shown in FIGS. 3A and 3B, a mobile communication system adopts a sector-cell structure that covers a service area by dividing a cell 1 into a plurality of sectors and placing for each sector on a base station 10. As the sector-cell structure, there is a three-sector structure as shown in FIG. 3A where the cell 1 is divided into three sectors, a first sector 1a, a second sector 1b, and a third sector 1c; and a six-sector structure as shown in FIG. 3B where the cell 1 is divided into six sectors, a first sector 1a, a second sector 1b, a third sector 1c, a fourth sector 1d, a fifth sector 1e, and a sixth sector 1f. A mobile communication system adopting the three-sector structure is described below, as an example.

Figure 4:
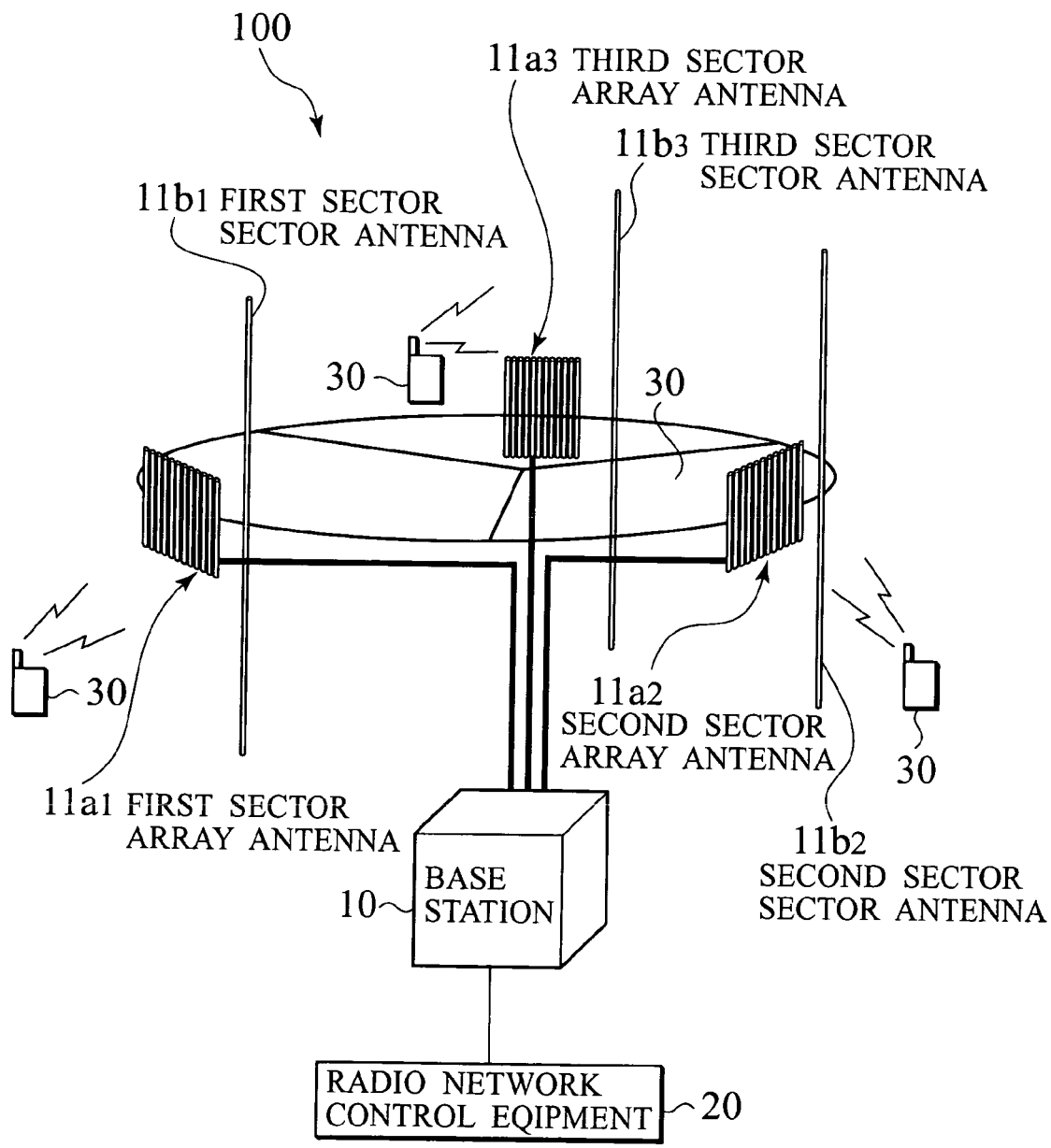
FIG. 4 is a diagram illustrating a configuration of a mobile communication system according to the first embodiment of the present invention.

As shown in FIG. 4, a mobile communication system 100 comprises a base station 10, a radio network control equipment 20, and a plurality of mobile stations 30. The base station 10 connects radio links with the mobile stations 30 existing in each sector, and performs signal reception/transmission. The base station 10 has both an array antenna and a sector antenna for each sector. The array antenna is a directional antenna that receives/transmits directional beams. The array antenna transmits a beam by narrowing it to each mobile station 30. The sector antenna is an omni-directional antenna that receives/transmits omnidirectional beams. The sector antenna transmits a beam that covers the entire sector so that all mobile stations 30 in the sector may receive signals.

More specifically, the base station 10 has a first sector array antenna 11a and a first sector sector antenna 11b, which cover the first sector 1a, a second sector array antenna 11a$_2$ and a second sector sector antenna 11b$_2$, which cover the second sector 1b, and a third sector array antenna 11a$_3$ and a third sector sector antenna 11b$_3$, which cover the third sector 1c. As shown in FIG. 4, the number of the sector antenna for each sector is one.

The radio network control equipment 20 connects to the base station 10. The radio network control equipment 20 controls for connections of radio links and handovers between the base station 10 and the mobile stations 30. The plurality of mobile stations 30 connect radio links with the base station 10, and perform signal reception/transmission from/to the base station 10 via the array antenna and/or sector antenna of the base station 10 that cover a sector where the mobile stations 30 exist.

Figure 5:
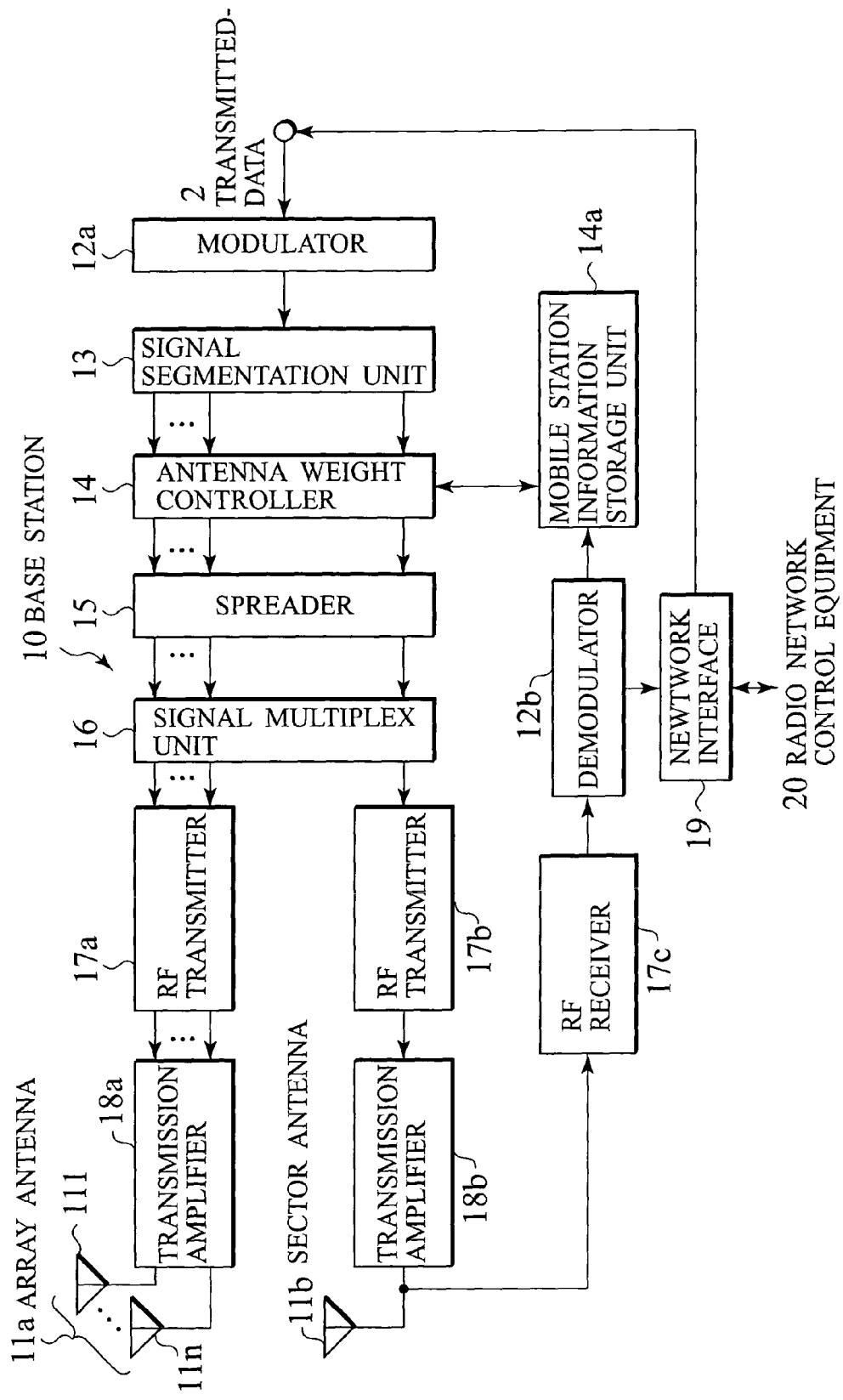
FIG. 5 is a diagram illustrating a configuration of a transmission system of the base station according to the first embodiment of the present invention.

Next, a configuration of the base station 10 is described in further detail using FIG. 5. In FIG. 5, for simplicity of explanation, a configuration required for the base station 10 in order to cover one sector is shown. Therefore, the base station 10 actually requires the same configuration shown in FIG. 5 for the number of sectors covered by the base station 10. FIG. 5 also shows a configuration of a transmission system required for transmitting transmitted-data to the mobile stations 30 included in the configuration of the base station 10.

As shown in FIG. 5, the base station 10 comprises an array antenna 11a, a sector antenna 11b, a modulator 12a, a demodulator 12b, a signal segmentation unit 13, an antenna weight controller 14, a mobile station information storage unit 14a, a spreader 15, a signal multiplex unit 16, a plurality of radio frequency transmitters (hereafter, referred to as RF transmitter) 17a and 17b, a radio frequency receiver (hereafter, referred to as RF receiver) 17c, a plurality of transmission amplifiers 18a and 18b, and a network interface 19.

Transmitted-data 2 from the base station 10 to the mobile stations 30 includes individual data and common data. Individual data refers to individual data for each mobile station 30, for example, information data. Common data refers to data common to a plurality of mobile stations 30, for example, control data. Individual data is transmitted to the mobile stations 30 through a downlink dedicated channel. Common data is transmitted to the mobile stations 30 through a downlink common channel. The transmitted-data 2 is inputted from the network interface 19 to the modulator 12a. The modulator 12a modulates the transmitted-data 2 to obtain a signal of the transmitted-data 2. The modulator 12a inputs the signal of the modulated transmitted-data 2 to the signal segmentation unit 13.

The signal segmentation unit 13 segments the signal of the modulated transmitted-data 2 inputted from the modulator 12a into a plurality of signal series. More specifically, the signal segmentation unit 13 segments the signal into a number of signal series, which is found by adding the number of the sector antenna 11b to the number of a plurality of antenna elements 11l through 11n included in the array antenna 11a. In other words, the signal segmentation unit 13 segments the signal of the transmitted-data 2 into each signal series transmitted by using respective antenna elements 11l through 11n of the array antenna 11a and sector antenna 11b. The signal segmentation unit 13 inputs the segmented plurality of signal series to the antenna weight controller 14.

The antenna weight controller 14 is an antenna controller, which determines whether or not the mobile stations 30 are capable of receiving a directional beam, and selects the array antenna 11a as an antenna to be used for transmitting individual data in the case where they are capable of receiving a directional beam, or selects the sector antenna 11b as an antenna for transmitting individual data in the case where they are incapable of receiving a directional beam. Hereafter, the mobile station that is capable of receiving a directional beam is referred to as 'a directional beam-capable mobile station'. In addition, the mobile station that is incapable of receiving a directional beam is referred to as 'a directional beam-incapable mobile station'. There are two types of mobile station: the directional beam-capable mobile station and the directional beam-incapable mobile station.

More specifically, to begin with, the antenna weight controller 14 determines whether the transmitted-data 2 included in the plurality of signal series inputted from the signal segmentation unit 13 is common data transmitted through a downlink common channel, or individual data transmitted through a downlink dedicated channel. The antenna weight controller 14 then selects the sector antenna 11b as an antenna to be used, when the transmitted-data 2 is common data transmitted through the downlink common channel. Meanwhile, when the transmitted-data 2 is individual data transmitted through the downlink dedicated channel, the antenna weight controller 14 determines whether the mobile station 30, which is the transmitted-data 2 destination, is a directional beam-capable mobile station or a directional beam-incapable mobile station by referring to the mobile station information storage unit 14*a*.

The mobile station information storage unit 14*a* stores mobile station information relating to each mobile station 30 that exists within a sector, and connects a radio link with the base station 10. Mobile station information includes the type of mobile station. In other words, the mobile station information unit 14*a* stores whether the mobile station 30 connecting a radio link with the base station 10 is a directional beam-capable mobile station or a directional beam-incapable mobile station. The mobile station information storage unit 14 stores mobile station information associating with mobile station identification data, which distinguishes the mobile station 30.

Therefore, the antenna weight controller 14 refers to the mobile station information storage unit 14*a* based on the mobile station identification data of the mobile station 30, which is an individual data destination, and determines whether that mobile station 30 is a directional beam-capable mobile station or a directional beam-incapable mobile station. The antenna weight controller 14 then selects the array antenna 11*a* as an antenna to be used, when the mobile station 30, which an individual data destination transmitted through the downlink dedicated channel, is a directional beam-capable mobile station. Meanwhile, the antenna weight controller 14 selects the sector antenna 11*b* as an antenna to be used, when the mobile station 30, which is an individual data destination transmitted through the downlink dedicated channel, is a directional beam-incapable mobile station.

The antenna weight controller 14 then determines an antenna weight to be multiplied for each signal series, which is transmitted from respective antenna elements 11*l* through 11*n* and sector antenna 11*b* inputted from the signal segmentation unit 13, based on the selected antenna to be used. When the sector antenna 11*b* is determined to be used, the antenna weight controller 14 determines the antenna weight for a signal series transmitted by using the array antenna 11*a* to be '0', and the antenna weight for a signal series transmitted by using the sector antenna 11*b* as being '1'. In other words, the antenna weight controller 14 determines the antenna weight for the signal series transmitted by using the array antenna 11*a* as being '0', when the transmitted-data 2 is common data, or when the mobile station 30 is a directional beam-incapable mobile station even if the transmitted-data 2 is individual data. More specifically, the antenna weight controller 14 determines the antenna weight for the signal series transmitted by using all antenna elements 11*l* through 11*n* as being '0'.

Meanwhile, when the array antenna 11*a* is determined to be used, the antenna weight controller 14 determines the antenna weight for the signal series transmitted by using the sector antenna 11*b* as being '0'. In other words, the antenna weight controller 14 determines the antenna weight for the signal series transmitted by using the sector antenna 11*b* as being '0', when the transmitted-data 2 is individual data and the mobile station 30 is a directional beam-capable mobile station. Furthermore, the antenna weight controller 14 determines the antenna weight for the signal series transmitted by using respective antenna elements 11*l* through 11*n* of the array antenna 11*a*, so as to form a directional beam that has a main beam directed towards the mobile station 30 to which the transmitted-data 2 is transmitted. As a result, interference to other mobile stations may be decreased.

The antenna weight controller 14 multiplies each signal series transmitted by using the respective antenna elements 11*l* through 11*n* and sector antenna 11*b* inputted from the signal segmentation unit 13 by the determined antenna weight for each signal series. The antenna weight controller 14 inputs to the spreader 15 the signal series that has been multiplied by the antenna weight. A signal series multiplied by '0' as the antenna weight is not output from the antenna weight controller 14. As a result, when the antenna weight for the signal series transmitted by using the array antenna 11*a* is '0', only the signal series transmitted by using the sector antenna 11*b* is inputted to the spreader 15. Meanwhile, when the antenna weight for a signal series transmitted by using the sector antenna 11*b* is 0', only the plurality of signal series transmitted by using the respective antenna elements of the array antenna 11*a* is inputted to the spreader 15.

The spreader 15 spreads the signal series that has been multiplied by an antenna weight and inputted from the antenna weight controller 14. The spreader 15 inputs the spread signal series to the signal multiplex unit 16. The signal multiplex unit 16 multiplexes the spread signal series. More specifically, the signal multiplex unit 16 multiplexes the signal series of the transmitted-data 2 to a plurality of mobile stations 30. The signal multiplex unit 16 inputs the multiplexed signals to the RF transmitter 17*a* and the RF transmitter 17*b*, respectively. Signals transmitted by using the array antenna 11*a* are inputted to the RF transmitter 17*a*. Signals transmitted by using the sector antenna 11*b* are inputted to the RF transmitter 17*b*.

The RF transmitters 17*a* and 17*b* perform frequency conversion to convert a signal inputted from the signal multiplex unit 16 into a radio frequency signal. The RF transmitters 17*a* and 17*b* input the signals whose frequency has been converted, to the transmission amplifiers 18*a* and 18*b*, respectively. The transmission amplifiers 18*a* and 18*b* amplify the signals inputted from the RF transmitters 17*a* and 17*b*, respectively. The transmission amplifier 18*a* inputs the amplified signal to the array antenna 11*a*. The transmission amplifier 18*b* inputs the amplified signal to the sector antenna 11*b*.

The array antenna 11*a* includes a plurality of antenna elements 11*l* through 11*n*. The amplified signal series of the transmitted-data 2 from the respective antenna elements 11*l* through 11*n* is inputted from the transmission amplifier 18*a* to the respective antenna elements 11*l* through 11*n* of the array antenna 11*a*. The inputted signal series of the transmitted-data 2 are multiplied by an antenna weight for each signal series transmitted from the antenna elements 11*l* through 11*n*, so as to enable directional beam transmission. In this case, the transmitted-data 2 is individual data, and the mobile station 30 is a directional beam-capable mobile station. As a result, the antenna weight controller 14 selects the array antenna 11*a* as an antenna to be used, and the signal series is not inputted to the sector antenna 11*b*. Accordingly, only the array antenna 11*a* transmits individual data with a directional beam to the mobile stations 30 through the downlink dedicated channel, by using a plurality of antenna elements 11*l* through 11*n*.

The amplified signal series of the transmitted-data 2 transmitted from the sector antenna 11*b* is inputted from the transmission amplifier 18*b* to the sector antenna 11*b*. In this case, the transmitted-data 2 is common data or individual data to the mobile station 30, which is a directional beam-incapable mobile station. As a result, the antenna weight controller 14 selects the sector antenna 11*b* as an antenna to be used, and the signal series is not inputted to the array antenna 11a. Accordingly, only the sector antenna 11b transmits common data with an omnidirectional beam to the mobile stations 30 through the downlink common channel. Alternatively, only the sector antenna 11b transmits individual data with an omnidirectional beam to the mobile stations 30 through the downlink dedicated channel.

In addition, the sector antenna 11b receives/transmits the signal from/to the mobile stations 30, when connecting radio links with the mobile stations 30. More specifically, the sector antenna 11b receives a preamble transmitted through the uplink common channel, which is referred to as a random access channel (RACH), when the mobile station 30 requests connection to a radio link. In addition, after receiving the preamble transmitted from the mobile stations 30, the sector antenna 11b transmits a signal (hereafter, referred to as 'an update instruction signal') for instructing the mobile stations 30 to update mobile station information from the radio network control equipment 20, through the downlink common channel, which is referred to as a forward access channel (FACH). In addition, the sector antenna 11b receives signals including mobile station information transmitted through the uplink dedicated channel, which is referred to as a dedicated control channel (DCCH), from the mobile stations 30 that have received the update instruction signal from the radio network control equipment 20. This mobile station information includes the type of mobile station 30. The sector antenna 11b inputs to the RF receiver 17c the received signals transmitted from the mobile stations 30 in connecting radio links.

The RF receiver 17c detects the signal inputted from the sector antenna 11b virtually synchronously, and inputs it to the demodulator 12b. The demodulator 12b demodulates the signal inputted from the RF receiver 17c and transmitted from the mobile stations 30 in connecting radio links. The demodulator 12b inputs the demodulated data to the network interface 19. More specifically, the demodulator 12b inputs data included in the preamble transmitted from the mobile stations 30, and the mobile station information included in the signal including mobile station information, to the network interface 19. In addition, the demodulator 12b stores the mobile station information included in the signal including mobile station information, in the mobile station information storage unit 14a. More specifically, the demodulator 12b associates the mobile station information including the type of the mobile stations 30 with mobile station identification data, and stores them in the mobile station information storage unit 14a. As a result, the base station 10 may grasp whether the mobile station 30 is a directional beam-capable mobile station or a directional beam-incapable mobile station.

The network interface 19 connects to the radio network control equipment 20. The network interface 19 transfers data from the mobile stations 30 and the base station 10 to the radio network control equipment 20. For example, the network interface 19 transfers the data included in the preamble transmitted from the mobile stations 30, and the mobile station information included in the signal including mobile station information, to the radio network control equipment 20. In addition, the network interface 19 obtains data transmitted to the base station 10 from the radio network control equipment 20. For example, the network interface 19 obtains from the radio network control equipment 20 the transmitted-data 2 from the base station 10 to the mobile stations 30, such as an update instruction signal, or data to the mobile stations 30 existing in a sector that is covered by the base station 10. The network interface 19 inputs to the modulator 12a the transmitted-data 2 obtained from the radio network control equipment 20.

Figure 6A:
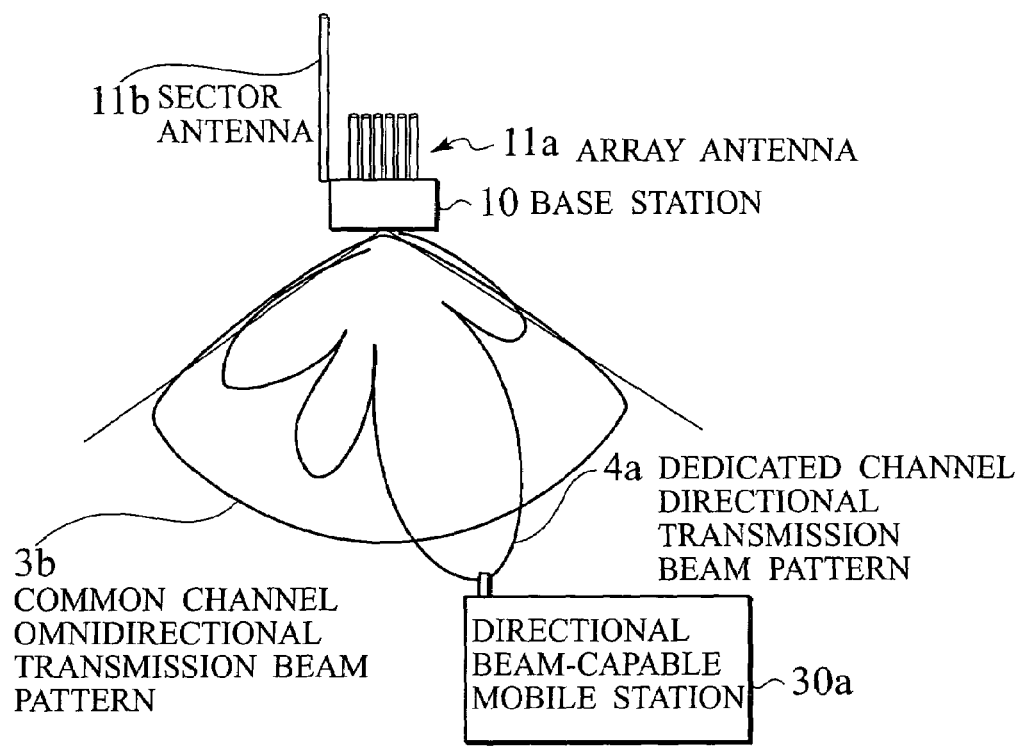
FIGS. 6A and 6B are diagrams illustrating beam patterns transmitted from the base station according to the first embodiment of the present invention.
Figure 6B:
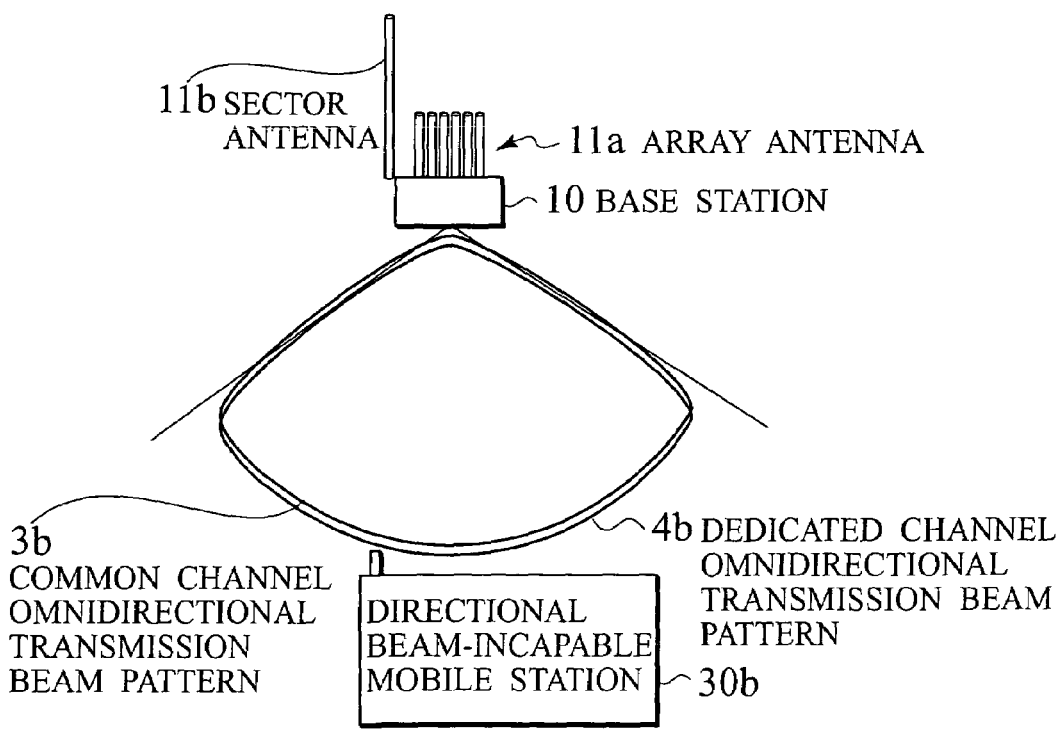
Figure 7:
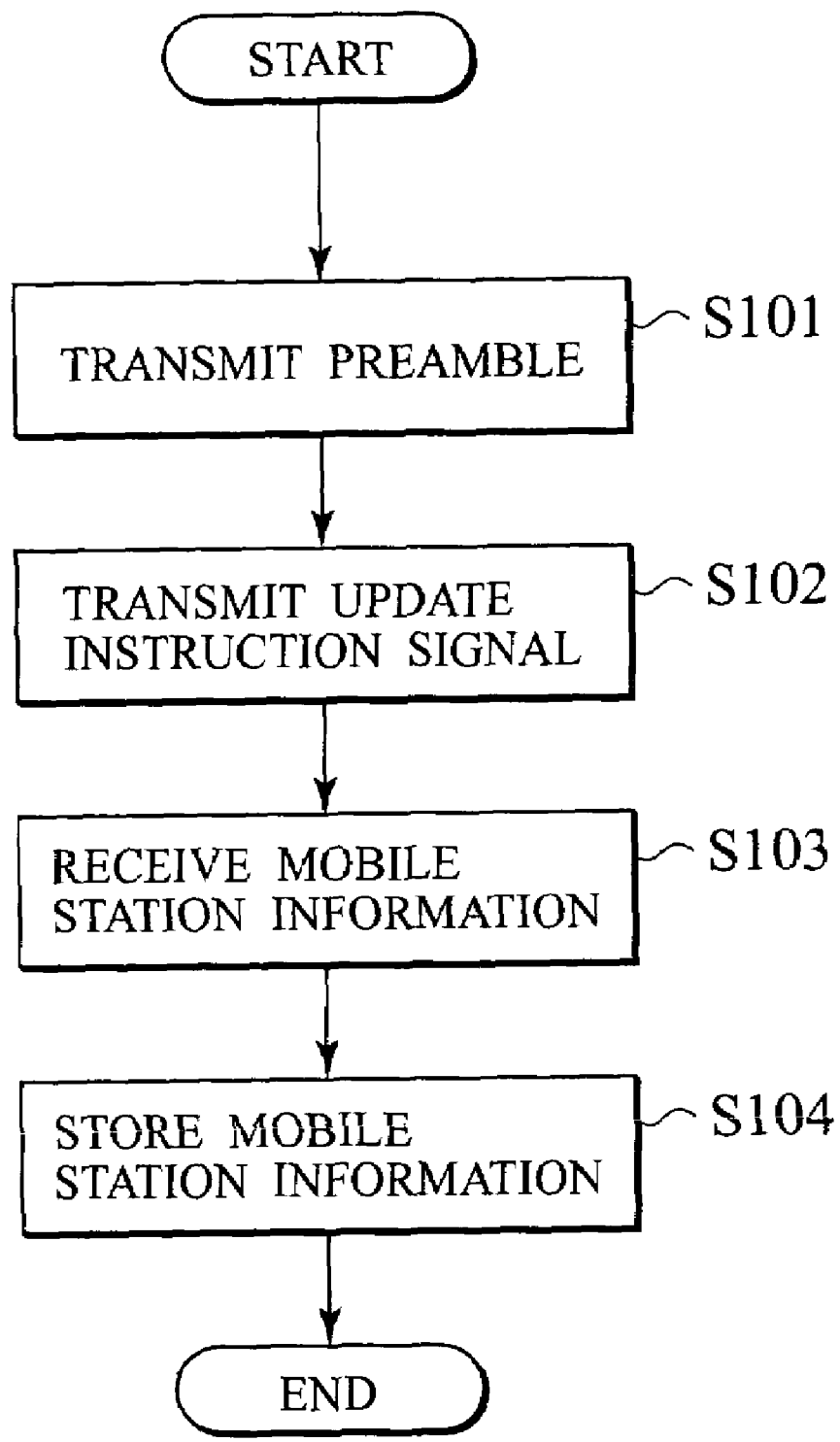
FIG. 7 is a flowchart illustrating a procedure for connecting a radio link between the base station and a mobile station according to the first embodiment of the present invention.

Next, FIGS. 6A and 6B show a directional beam pattern (hereafter, referred to as 'directional transmission beam pattern'), and an omnidirectional beam pattern (hereafter, referred to as 'omnidirectional transmission beam pattern') transmitted from the base station 10, respectively. In FIGS. 6A and 6B, for simplicity of explanation, one sector is described as an example.

FIG. 6A shows a beam pattern when the base station 10 transmits transmitted-data to a directional beam-capable mobile station 30a. The base station 10 transmits common data, such as control data, with an omnidirectional beam through the common channel, by using the sector antenna 11b, in order to transmit common data to all mobile stations existing in a sector. Therefore, the common channel beam pattern transmitted to the directional beam-capable mobile station 30a is formed as a common channel omnidirectional transmission beam pattern 3b from the sector antenna 11b as shown in FIG. 6A.

In addition, the base station 10 transmits individual data to the directional beam-capable mobile station 30a through the dedicated channel, by using the array antenna 11a. More specifically, the base station 10 transmits a directional beam by controlling the antenna weight for a signal series transmitted from a plurality of antenna elements included in the array antenna 11a. Therefore, the dedicated channel beam pattern transmitted to the directional beam-capable mobile station 30a is formed as a dedicated channel directional transmission beam pattern 4a from the array antenna 11a as shown in FIG. 6A.

FIG. 6B shows a beam pattern when the base station 10 transmits transmitted-data to a directional beam-incapable mobile station 30b. The base station 10 transmits common data with an omnidirectional beam through the common channel, by using the sector antenna 11b as with the case of the directional beam-capable mobile station 30a. Therefore, the common channel beam pattern transmitted to the directional beam-incapable mobile station 30b is formed as a common channel omnidirectional transmission beam pattern 3b from the sector antenna 11b as shown in FIG. 6B. In addition, the base station 10 transmits to the directional beam-incapable mobile station 30b individual data through the dedicated channel, by using the sector antenna 11b. Therefore, the dedicated channel beam pattern transmitted to the directional beam-incapable mobile station 30b is formed as a dedicated channel omnidirectional transmission beam pattern 4b from the sector antenna 11b as shown in FIG. 6B.

(Communication Method)

Next, a communication method using the mobile communication system 100 is described. To begin with, a procedure for connecting a radio link between the base station 10 and the mobile station 30 is described. The mobile station 30, which requires to connect a radio link, transmits a preamble through the uplink common channel referred to as RACH (S101). The RF receiver 17c of the base station 10, which has received the preamble by using the sector antenna 11b, transfers data included in the preamble to the radio network control equipment 20 via the demodulator 12b and the network interface 19. Upon reception thereof, the radio network control equipment 20 transfers an update instruction signal for mobile station information to the base station 10. The base station 10 obtains the update instruction signal transferred from the radio network control equipment 20 via the network interface 19. The base station 10 then transmits the update instruction signal to the mobile station 30 through the downlink common channel, which is referred to as FACH, by using the sector antenna 11b (S102).

The mobile station 30 that has received the update instruction signal from the radio network control equipment 20, transmits to the base station 10 a signal including mobile station information through the uplink dedicated channel, which is referred to as DCCH. The RF receiver 17c of the base station 10 receives the signal including mobile station information transmitted from the mobile station 30, by using the sector antenna 11b (S103). The RF receiver 17c then inputs to the demodulator 12b the received signal including mobile station information. The demodulator 12b stores the mobile station information received from the mobile station 30, in the mobile station information storage unit 14a (S104).

Figure 8:
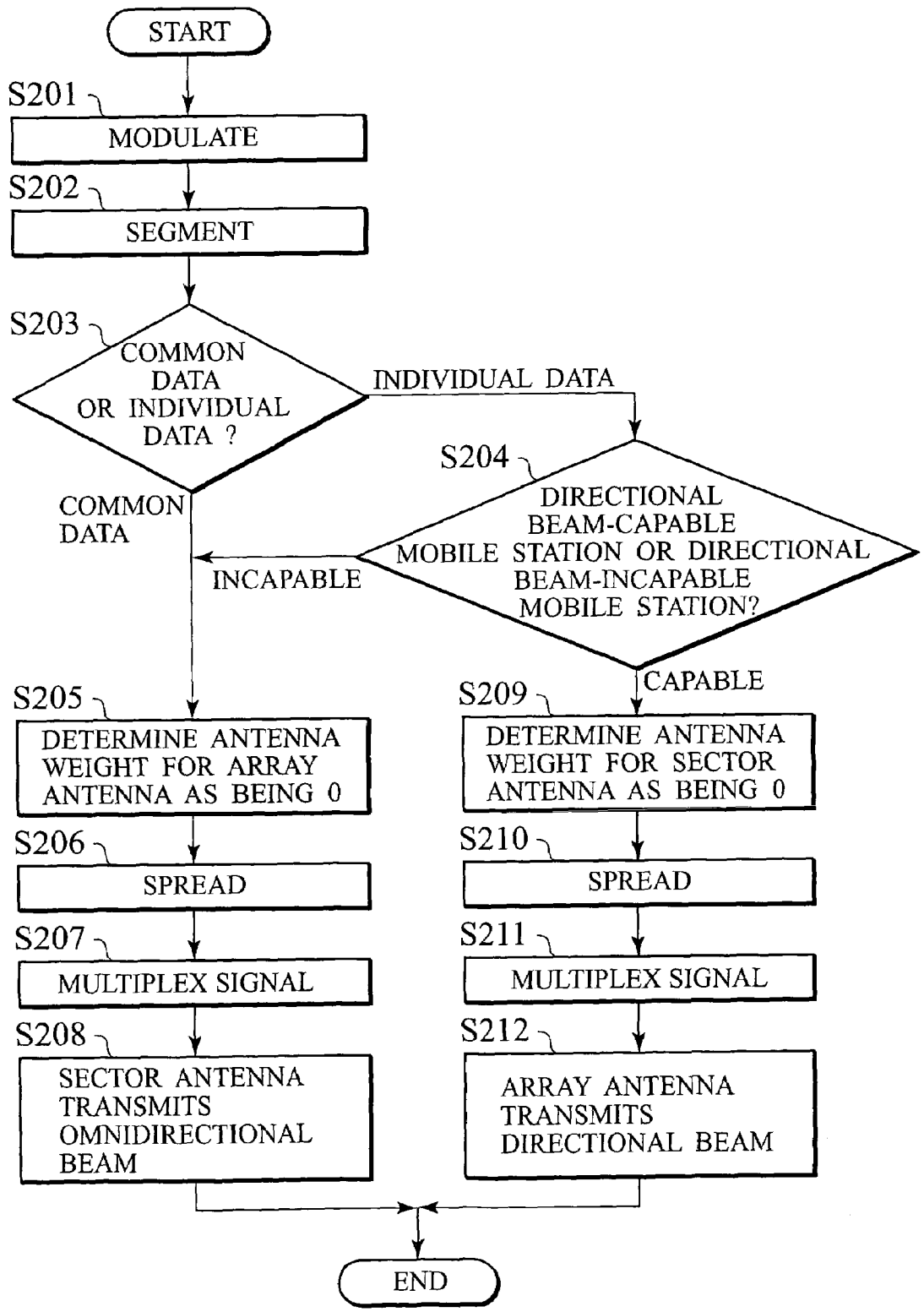
FIG. 8 is a flowchart illustrating a procedure for transmitting transmitted-data from the base station according to the first embodiment of the present invention.

Next, a procedure for transmitting transmitted-data from the base station 10 is described using FIG. 8. To begin with, the modulator 12a of the base station 10 modulates the transmitted-data 2 so as to obtain a signal from the transmitted-data 2 (S201). Next, the signal segmentation unit 13 segments the signal of the modulated transmitted-data 2 into a plurality of signal series. More specifically, the signal segmentation unit 13 segments the signal into a number of signal series, which is found by adding the number of the sector antenna 11b to the number of a plurality of antenna elements 11l through 11n included in the array antenna 11a (S202).

Next, the antenna weight controller 14 determines whether the transmitted-data 2 included in a plurality of signal series is common data transmitted through the downlink common channel, or individual data transmitted through the downlink dedicated channel (S203). In step (S203), when the transmitted-data 2 is individual data transmitted through the downlink dedicated channel, the antenna weight controller 14 refers to the mobile station information storage unit 14a, and determines whether the mobile station 30, which is the transmitted-data 2 destination, is a directional beam-capable mobile station or a directional beam-incapable mobile station (S204).

In step (S203), when the transmitted-data 2 is common data transmitted through the downlink common channel, or in step (S204), when the mobile station 30, which is an individual data destination transmitted through the downlink dedicated channel, is a directional beam-incapable mobile station, the antenna weight controller 14 selects the sector antenna 11b as an antenna to be used. The antenna weight controller 14 then determines an antenna weight for a signal series transmitted from the array antenna 11a as being '0', and determines an antenna weight for a signal series transmitted from the sector antenna 11b as being '1' (S205).

Meanwhile, in step (S204), when the mobile station 30, which is an individual data destination transmitted through the downlink dedicated channel, is a directional beam-capable mobile station, the antenna weight controller 14 selects the array antenna 11a as an antenna to be used. The antenna weight controller 14 then determines the antenna weight for a signal series transmitted from the sector antenna 11b as being '0'. The antenna weight controller 14 also determines the antenna weight for a signal series transmitted by using respective antenna elements 11l through 11n of the array antenna 11a so as to form a directional beam that has a main beam directed towards the mobile station 30 transmitted the transmitted-data 2 (S209).

Following steps (S205) and (S209), the spreader 15 spreads a signal series multiplied by the antenna weight (S206, S210). Next, the signal multiplex unit 16 multiplexes the spread signal series of the transmitted-data 2 to a plurality of the mobile stations 30 (S207, S211). Following step (S207), the RF transmitter 17b converts the signal inputted from the signal multiplex unit 16 into a radio frequency signal, and the transmission amplifier 18b amplifies it. The transmission amplifier 18b inputs the amplified signal to the sector antenna 11b. Finally, since the signal series to the array antenna 11a is multiplied by the antenna weight, which has been determined as being '0' in step (S205), only the sector antenna 11b transmits common data with an omnidirectional beam to the mobile station 30 through the downlink common channel. Alternatively, only the sector antenna 11b transmits individual data with an omnidirectional beam to the mobile station 30 through the downlink dedicated channel (S208).

Meanwhile, following step (S211), the RF transmitter 17a converts the signal inputted from the signal multiplex unit 16 into a radio frequency signal, and the transmission amplifier 18a amplifies it. The transmission amplifier 18a inputs the amplified signal to the array antenna 11a. Finally, since the signal series to the sector antenna 11b is multiplied by the antenna weight, which has been determined as being '0' in step (S209), only the array antenna 11a transmits individual data with a directional beam to the mobile station 30 through the downlink dedicated channel (S212).

According to the mobile communication system 100, the base station 10, and the communication method, the base station 10 comprises both the array antenna 11a used to transmit a directional beam to the mobile stations 30, and the sector antenna 11b used to transmit an omnidirectional beam to the mobile stations 30, for each sector. The antenna weight controller 14 determines whether the mobile station 30 is a directional beam-capable mobile station or a directional beam-incapable mobile station by referring to the mobile station information storage unit 14a. The antenna weight controller 14 then selects the array antenna 11a as an antenna to be used for transmitting individual data through the downlink dedicated channel when the mobile station 30 is a directional beam-capable mobile station. Meanwhile, when the mobile station 30 is a directional beam-incapable mobile station, the antenna weight controller 14 selects the sector antenna 11b as an antenna to be used for transmitting individual data through the downlink dedicated channel.

Accordingly, the base station 10 may switch an antenna to be used for transmitting individual data through the downlink dedicated channel according to the type of the mobile station 30. As a result, the base station 10 may transmit signals appropriately, according to the type of mobile station 30, and the mobile station 30 may receive signals appropriately.

More specifically, the base station 10 may transmit individual data with a directional beam through the downlink dedicated channel by using the array antenna 11a, to the directional beam-capable mobile station. As a result, the base station 10 may improve beam gain and decrease the saturation power of the transmission amplifier 18a. In addition, the base station 10 may transmit individual data with an omnidirectional beam through the downlink dedicated channel, by using the sector antenna. 11b, to the directional beam-incapable mobile station. Accordingly, the base station 10 may prevent an increase in the saturation power of the transmission amplifier, when transmitting the omnidirectional beam by using a directional antenna as with the first or the second conventional method. As a result, the equipment scale of the base station 10 may be reduced.

In addition, the antenna weight controller 14 determines and multiplies an antenna weight multiplied for each signal series, which is transmitted from the respective antenna elements 11*l* through 11*n* and sector antenna 11*b*, based on the selected antenna to be used. More specifically, when the sector antenna 11*b* is determined to be used, the antenna weight controller 14 determines the antenna weight for a signal series transmitted by using the array antenna 11*a* as being '0'. Meanwhile, when the array antenna 11*a* is determined to be used, the antenna weight controller 14 determines the antenna weight for a signal series transmitted, by using the sector antenna 11*b* as being '0'. The antenna weight controller 14 multiplies each signal series transmitted from the respective antenna elements 11*l* through 11*n* and sector antenna 11*b*, by the determined antenna weight for each signal series.

In this manner, the antenna weight controller 14 may easily switch between individual data directional beam transmission using only the array antenna 11*a* and individual data omnidirectional beam transmission using only the sector antenna 11*b* by only controlling the antenna weight multiplied to a signal series transmitted from each antenna, based on the selected antenna to be used. In addition, since the mobile station information storage unit 14*a* stores mobile station type, the antenna weight controller 14 may easily determine whether the mobile station 30 is a directional beam-capable mobile station or a directional beam-incapable mobile station, by referring to the mobile station information storage unit 14*a*.

Furthermore, the antenna weight controller 14 determines whether the transmitted-data 2 to the mobile station 30 is individual data or common data that is common to a plurality of mobile stations, and selects the sector antenna 11*b* as an antenna to be used for transmitting common data when the transmitted-data 2 is common data transmitted through the downlink common channel. As a result, the base station 10 may transmit common data with an omnidirectional beam by using the sector antenna 11*b* so that a plurality of mobile stations 30 may receive common data. Accordingly, the base station 10 may prevent an increase in the saturation power of the transmission amplifier when transmitting the omnidirectional beam by using the directional antenna as with the first or the second conventional method. As a result, the equipment scale of the base station 10 may be further reduced.

[Second Embodiment]

(Mobile Communication System)

Figure 9:
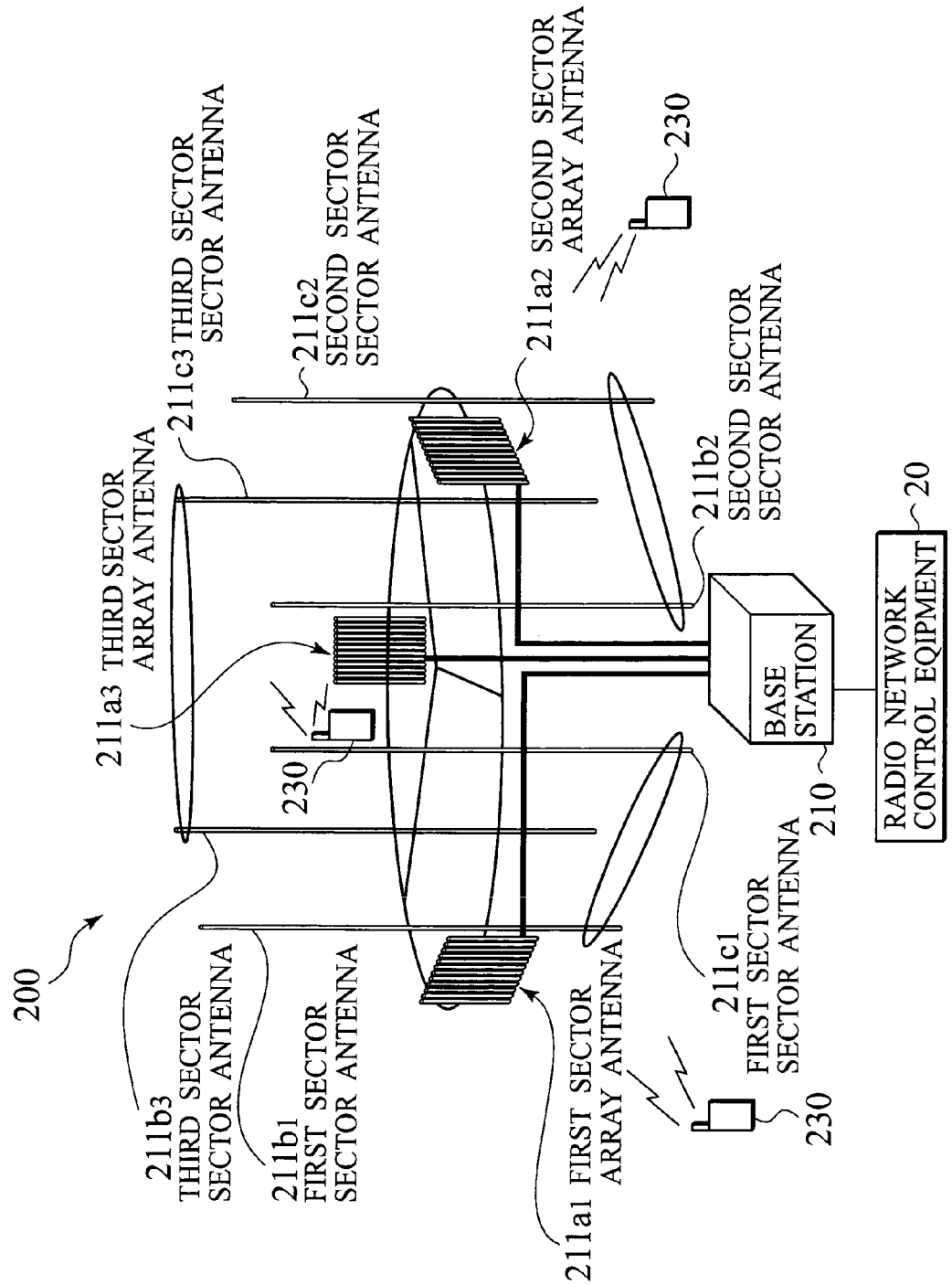
FIG. 9 is a diagram illustrating a configuration of a mobile communication system according to a second embodiment of the present invention.

A mobile communication system 200 adopting the three-sector structure shown in FIG. 3A is described below, as an example. As shown in FIG. 9, a mobile communication system 200 comprises a base station 210, a radio network control equipment 20, and a plurality of mobile stations 230. The base station 210 comprises a first sector array antenna 211$a_1$, a first sector sector antenna 211$b_1$, and a first sector sector antenna 211$c_1$, which cover the first sector 1*a*; a second sector array antenna 211$a_2$, a second sector sector antenna 211$b_2$, and a second sector sector antenna 211$c_2$, which cover the second sector 1*b*; and a third sector array antenna 211$a_3$, a third sector sector antenna 211$b_3$, and a third sector sector antenna 211$c_3$, which cover the third sector 1*c*.

As shown in FIG. 9, the number of the sector antennas for each sector is two, that is, the base station 210 comprises a plurality of sector antennas. When DS-CDMA is adopted as a radio access, the base station 210 may transmit signals to the mobile stations 230 by adopting transmit diversity using a plurality of sector antennas for each sector. In addition, the base station 210 may perform antenna diversity reception of signals from the mobile stations 230 by using a plurality of sector antennas, an array antenna and one sector antenna, or an array antenna and a plurality of sector antennas.

A plurality of mobile stations 230 has a function to receive signals from the base station 210 transmitted by adopting transmit diversity. Except for this point, the mobile station 230 is substantially the same as the mobile station 30 shown in FIG. 4. The radio network control equipment 20 is substantially the same as the radio network control equipment 20 shown in FIG. 4, therefore, description giving the same reference numerals is omitted.

Next, a configuration of the base station 210 is described in further detail using FIG. 10. In FIG. 10, for simplicity of explanation, a configuration required for the base station 210 in order to cover one sector is shown. Therefore, the base station 210 actually requires the same configuration shown in FIG. 10 for the number of sectors covered by the base station 210. FIG. 10 also shows a configuration of a transmission system required for transmitting transmitted-data to the mobile stations 230 included in the configuration of the base station 210. As shown in FIG. 10, the base station 210 comprises an array antenna 211*a*, a plurality of sector antennas 211*b* and 211*c*, a modulator 212*a*, a plurality of demodulators 212*b* and 212*c*, a signal segmentation unit 213, an antenna weight controller 214, a mobile station information storage unit 214*a*, a spreader 215, a signal multiplex unit 216, a plurality of RF transmitters 217*a*, 217*b*, and 217*c*, a plurality of RF receivers 217*d* and 217*e*, a plurality of transmission amplifiers 218*a*, 218*b*, and 218*c*, a network interface 219, a transmit diversity weight controller 220, and a combiner 221.

The modulator 212*a*, the signal segmentation unit 213, the antenna weight controller 214, the mobile station information storage unit 214*a*, and the network interface 219 are substantially the same as the modulator 12*a*, the signal segmentation unit 13, the antenna weight controller 14, the mobile station information storage unit 14*a*, and the network interface 19 shown in FIG. 5, respectively. Therefore, description thereof is omitted.

The spreader 215 spreads a signal series, which is multiplied by antenna weight, and inputted from the antenna weight controller 214. The spreader 215 inputs a signal series, which is transmitted by using the array antenna 211*a*, and included in the spread signal series, to the signal multiplex unit 216. In addition, the spreader 215 inputs a signal series transmitted by using the sector antennas 211*b* and 211*c* included in the spread signal series, to the transmit diversity weight controller 220.

The transmit diversity weight controller 220 is a transmit diversity controller that controls transmit diversity to be performed by using a plurality of sector antennas 211*b* and 211*c*. More specifically, the transmit diversity weight controller 220 performs antenna weight control for transmit diversity to the spread signal series inputted from the spreader 215. As a result, the transmit diversity weight controller 220 controls transmit diversity by generating two signal series transmitted from two sector antennas 211*b* and 211*c*, respectively.

More specifically, to begin with, the transmit diversity weight controller 220 segments the spread signal series inputted from the spreader 215, into the same number of signal series as that of the plurality of sector antennas 211*b* and 211*c*. In other words, the transmit diversity weight controller 220 segments a signal series for each signal series transmitted from the respective sector antennas 211*b* and 211*c*. The transmit diversity weight controller 220 then determines a transmit diversity antenna weight multiplied for each signal series transmitted from the respective sector antennas 211b and 211c. The transmit diversity weight controller 220 then multiplies the respective signal series transmitted from the sector antenna 211b and 211c by the determined transmit diversity antenna weight for each signal series. In this manner, the transmit diversity weight controller 220 generates two signal series transmitted from the two sector antennas 211b and 211c, respectively. The transmit diversity weight controller 220 inputs the signal series multiplied by the transmit diversity antenna weight, to the signal multiplex unit 216.

It should be noted that the base station 210 may transmit signals to the mobile stations 230 without adopting transmit diversity as in the case where DS-CDMA is not adopted as the radio access. The transmit diversity weight controller 220 selects either the sector antenna 211b or the sector antenna 211c as an antenna to be used for signal transmission, in the case of transmitting signals without adopting transmit diversity. The transmit diversity weight controller 220 then determines the antenna weight for the selected sector antenna as being '1', and determines the antenna weight for the sector antenna not selected as being '0'. As a result, a signal series multiplied by '0' as an antenna weight is not output from the transmit diversity weight controller 220.

The signal multiplex unit 216 multiplexes the spread signal series with the signal series performed transmit diversity antenna weight control. More specifically, the signal multiplex unit 216 multiplexes the signal series of the transmitted-data 2a to a plurality of mobile stations 230. The signal multiplex unit 216 inputs the multiplexed signals to the RF transmitter 217, the RF transmitter 217b, and the RF transmitter 217c, respectively. The signals transmitted by using the array antenna 211a are inputted to the RF transmitter 217a. The signals transmitted by using the sector antenna 211b are inputted to the RF transmitter 217b. The signals transmitted by using the sector antenna 211c are inputted to the RF transmitter 217c.

The RF transmitters 217a, 217b, and 217c perform frequency conversion so as to convert signals inputted from the signal multiplex unit 216 into radio frequency signals. The RF transmitters 217a, 217b, and 217c input the signals performed frequency conversion, to the transmission amplifiers 218a, 218b, and 218c, respectively. The transmission amplifiers 218a, 218b, and 218c amplify the signals inputted from the RF transmitters 217a, 217b, and 217c, respectively. The transmission amplifier 218a inputs amplified signals to the array antenna 211a. The transmission amplifier 218b inputs the amplified signal to the sector antenna 211b. The transmission amplifier 218c inputs the amplified signal to the sector antenna 211c.

The array antenna 211a includes a plurality of antenna elements 211l through 211n. An amplified signal series of the transmitted-data 2a transmitted by the respective antenna elements 211l through 211n is, inputted from the transmission amplifier 218a to each of the antenna elements 211l through 211n of the array antenna 211a. As with the array antenna 11a shown in FIG. 5, the array antenna 211a transmits individual data to a mobile station 230 that is a directional beam-capable mobile station with a directional beam through the downlink dedicated channel, by using a plurality of antenna elements 211l through 211n.

An amplified signal series of the transmitted-data 2a transmitted by the sector antenna 211b, is inputted from the transmission amplifier 218b to the sector antenna 211b. An amplified signal series of the transmitted-data 2a transmitted by the sector antenna 211c, is inputted from the transmission amplifier 218c to the sector antenna 211c. As with the sector antenna 11b shown in FIG. 5, the sector antennas 211b and 211c transmit common data to the mobile stations 230 with an omnidirectional beam through the downlink common channel. Alternatively, the sector antennas 211b and 211c transmit individual data with an omnidirectional beam to a mobile station 230 that is a directional beam-incapable mobile stations 230 through the downlink dedicated channel.

Furthermore, the signal series of the transmitted-data 2a inputted to the sector antennas 211b and 211c multiplied by the transmit diversity antenna weight. Therefore, the sector antennas 211b and 211c transmit the signal series that is multiplied by the transmit diversity antenna weight, that is, signal transmission adapting transmit diversity is performed. In addition, in the case of transmitting signals without adapting transmit diversity, the transmit diversity weight controller 220 determines the antenna weight for the selected sector antenna as being '1', and the antenna weight for the sector antenna not selected as being '0'. Accordingly, the signal series multiplied by '0' as the antenna weigh is not output from the transmit diversity weight controller 220. As a result, signals are transmitted only from the selected sector antenna without adapting transmit diversity.

In addition, the sector antennas 211b and 211c receive/transmit signals from/to the mobile stations 230 in connecting radio links with the mobile stations 230 as with the sector antenna 11b shown in FIG. 5. The sector antennas 211b and 211c input the received signals transmitted from the mobile stations 230 in connecting radio links, to the RF receivers 217d and 217e, respectively. The RF receivers 217d and 217e detect the signals inputted from the sector antennas 211b and 211c virtually synchronously, and input them to the demodulators 212b and 212c, respectively.

The demodulator 212b demodulates the signal that is inputted from the RF receiver 217d and transmitted from the mobile stations 230 in connecting a radio link. The demodulator 212c demodulates the signal that is inputted from the RF receiver 217e and transmitted from the mobile stations 230 in connecting a radio link. The demodulators 212b and 212c input the demodulated data to the combiner 221. The combiner 221 multiplied demodulated data inputted from the demodulators 212b and 212c by antenna weights for antenna diversity reception, respectively, and combines them. The combiner 221 inputs the combined data to the network interface 219. More specifically, the combiner 221 inputs the data included in the preamble transmitted from the mobile stations 230, and mobile station information included in the signal, to the network interface 219.

In addition, the combiner 221 stores the mobile station information included in the signal, in the mobile station information storage unit 214a. More specifically, the combiner 221 associates the mobile station information including the type of the mobile stations 230 with mobile station identification data, and stores them in the mobile station information storage unit 214a. As a result, the base station 210 may grasp whether the mobile station 230 is a directional beam-capable mobile station or a directional beam-incapable mobile station.

Next, FIGS. 11A and 11B show a directional transmission beam pattern and an omnidirectional transmission beam pattern transmitted from the base station 210. In FIGS. 11A and 11B, for simplicity of explanation, one sector is described as an example. FIG. 11A shows a beam pattern when the base station 210 transmits transmitted-data to a directional beam-capable mobile station 230a. The base station 210 transmits common data, such as control data, with an omnidirectional beam through the common channel, in order to transmit common data to all mobile stations existing in a sector. In this case, when the base station 210 does not adopt transmit diversity, the base station 210 transmits common data by using either the sector antenna 211b or the sector antenna 211c. Therefore, the common channel beam pattern transmitted to the directional beam-capable mobile station 230a is formed as a common channel omnidirectional transmission beam pattern 3b from the sector antenna as shown in FIG. 11A.

In addition, when the base station 210 and the directional beam-capable mobile station 230a adopt DS-CDMA as the radio access, and the base station 210 adopts transmit diversity, the base station 210 transmits common data with an omnidirectional beam through the common channel adopting transmit diversity, by using two sector antennas 211b and 211c. In this case, the common channel beam pattern transmitted to the directional beam-capable mobile station 230a is formed as a plurality of the common channel omnidirectional transmission beam patterns 3b from the sector antenna shown in FIG. 11A.

In addition, the base station 210 transmits individual data with a directional beam through the dedicated channel, by using the array antenna 211a, to the directional beam-capable mobile station 230a. More specifically, the base station 210 transmits the directional beam by controlling the antenna weight for a signal series transmitted from a plurality of antenna elements included in the array antenna 211a. Therefore, the dedicated channel beam pattern transmitted to the directional beam-capable mobile station 230a is formed as a dedicated channel directional transmission beam pattern 4a from the array antenna 211a as shown in FIG. 11A.

FIG. 11B shows a beam pattern when the base station 210 transmits transmitted-data to a directional beam-incapable mobile station 230b. When the base station 210 does not adopt transmit diversity, the base station 210 transmits common data with an omnidirectional beam through the common channel, by using either the sector antenna 211b or 211c as with the case of the directional beam-capable mobile station 230a. Therefore, the common channel beam pattern transmitted to the directional beam-incapable mobile station 230b is formed as a common channel omnidirectional transmission beam pattern 3b from the sector antenna as shown in FIG. 11B.

In addition, when the base station 210 and the directional beam-incapable mobile station 230b adopt DS-CDMA as the radio access, and the base station 210 adopts transmit diversity, the base station 210 transmits common data with an omnidirectional beam through the common channel adopting transmit diversity, by using the two sector antennas 211b and 211c. In this case, the common channel beam pattern transmitted to the directional beam-incapable mobile station 230b is formed as a plurality of common channel omnidirectional transmission beam patterns 3b, by using the sector antenna shown in FIG. 11B.

In addition, when the base station 210 does not adopt transmit diversity, the base station 210 transmits individual data with an omnidirectional beam through the dedicated channel, by using either the sector antenna 211b or 211c, to the directional beam-incapable mobile station 230b. Therefore, the dedicated channel beam pattern transmitted to the directional beam-incapable mobile station 230b is formed as a dedicated channel omnidirectional transmission beam pattern 4b from the sector antenna as shown in FIG. 11B. In addition, when the base station 210 and the directional beam-incapable mobile station 230b adopt DS-CDMA as the radio access, and the base station 210 adopts transmit diversity, the base station 210 transmits individual data with an omnidirectional beam through the dedicated channel adopting transmit diversity, by using two sector antennas 211b and 211c. In this case, the dedicated channel beam pattern transmitted to the directional beam-incapable mobile station 230b is formed as a plurality of dedicated channel omnidirectional transmission beam patterns 4b, by using the sector antenna shown in FIG. 11B.

Figure 12:
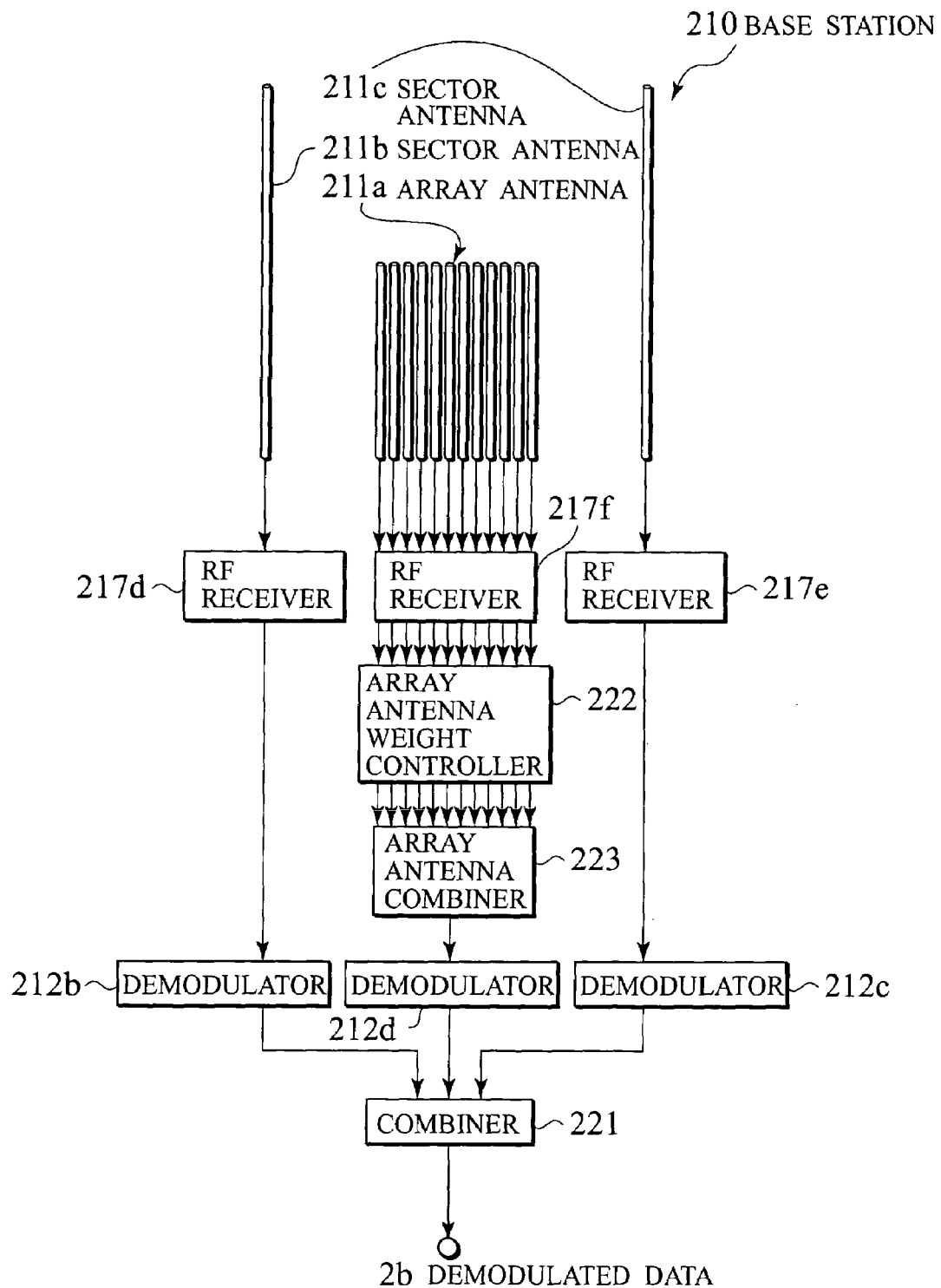
FIG. 12 is a diagram illustrating a configuration of a reception system of the base station according to the second embodiment of the present invention.

Next, a configuration of a reception system of the base station 210 is described in further detail using FIG. 12. FIG. 12 shows a configuration of the reception system required for receiving data transmitted from the mobile stations 230 included in the configuration of the base station 210. In addition, for simplicity of explanation, a configuration required for the base station 210 in order to cover one sector is shown in FIG. 12. Therefore, the base station 210 requires the same configuration shown in FIG. 12 for the number of sectors covered by the base station 210. As shown in FIG. 12, the base station 210 comprises an array antenna 211a, a plurality of sector antennas 211b and 211c, a plurality of RF receivers 217d, 217e, and 217f, a plurality of demodulators 212b, 212c, and 212d, a combiner 221, an array antenna weight controller 222, and an array antenna combiner 223.

The array antenna 211a and two sector antennas 211b and 211c receive signals including data transmitted from the mobile stations 230. Each antenna element of the array antenna 211a inputs the received reception signal to the RF receiver 217f. The RF receiver 217f detects virtually synchronously the signal inputted from each antenna element of the array antenna 211a, and inputs it to the array antenna weight controller 222. In addition, the sector antennas 211b and 211c input the reception signals to the RF receivers 217d and 217e, respectively. The RF receivers 217d and 217e detect virtually synchronously the signals inputted from the sector antennas 211b and 211c, and input them to the demodulators 212b and 212c, respectively.

The array antenna weight controller 222 controls antenna weight for the reception signal received by each antenna element of the array antenna 211a. More specifically, the array antenna weight controller 222 determines the antenna weight for the reception signal received by each antenna element of the array antenna 211a. The array antenna weight controller 222 then multiplies the reception signal received by each antenna element, by the determined antenna weight. The array antenna weight controller 222 inputs the received signal multiplied by the antenna weight, to the array antenna combiner 223. The array antenna combiner 223 combines the reception signal of each antenna element multiplied by the antenna weight. The array antenna combiner 223 inputs the combined reception signal to the demodulator 212d.

The demodulators 212b and 212c demodulate the reception signals inputted from the RF receivers 217d and 217e, respectively. The demodulator 212d demodulates the reception signal inputted from the array antenna combiner 223. The demodulators 212d, 212b, and 212c input the demodulated data to the combiner 221. In this manner, the base station 212 has a configuration for performing three-branch antenna diversity reception using all reception signals received by all antennas, that is, the array antenna 211a and two sector antennas 211b and 211c, for demodulating data.

The combiner 221 is a diversity reception controller that controls antenna diversity reception of signals from the mobile stations 230. More specifically, the combiner 221 multiplies the demodulated data inputted from the demodulators 212d, 212b, and 212c by weights, respectively, and combines them. More specifically, to begin with, the combiner 221 multiplies each demodulated data by an antenna weight for antenna diversity reception.

For example, the combiner 221 determines the antenna weight for antenna diversity reception to be multiplied each demodulated data, according to the reception level of the reception signals received by the array antenna 211a and the sector antennas 211b and 211c. The combiner 221 multiplies each demodulated data by the determined antenna weight for antenna diversity reception. The combiner 221 combines each multiplied data, and obtains combined and demodulated data 2b. In this manner, the combiner 221 controls antenna diversity reception by controlling the antenna weight for antenna diversity reception to be multiplied by each demodulated data. The combiner 221 inputs the combined and demodulated data 2b to the network interface 219.

(Communication Method)

Figure 13:
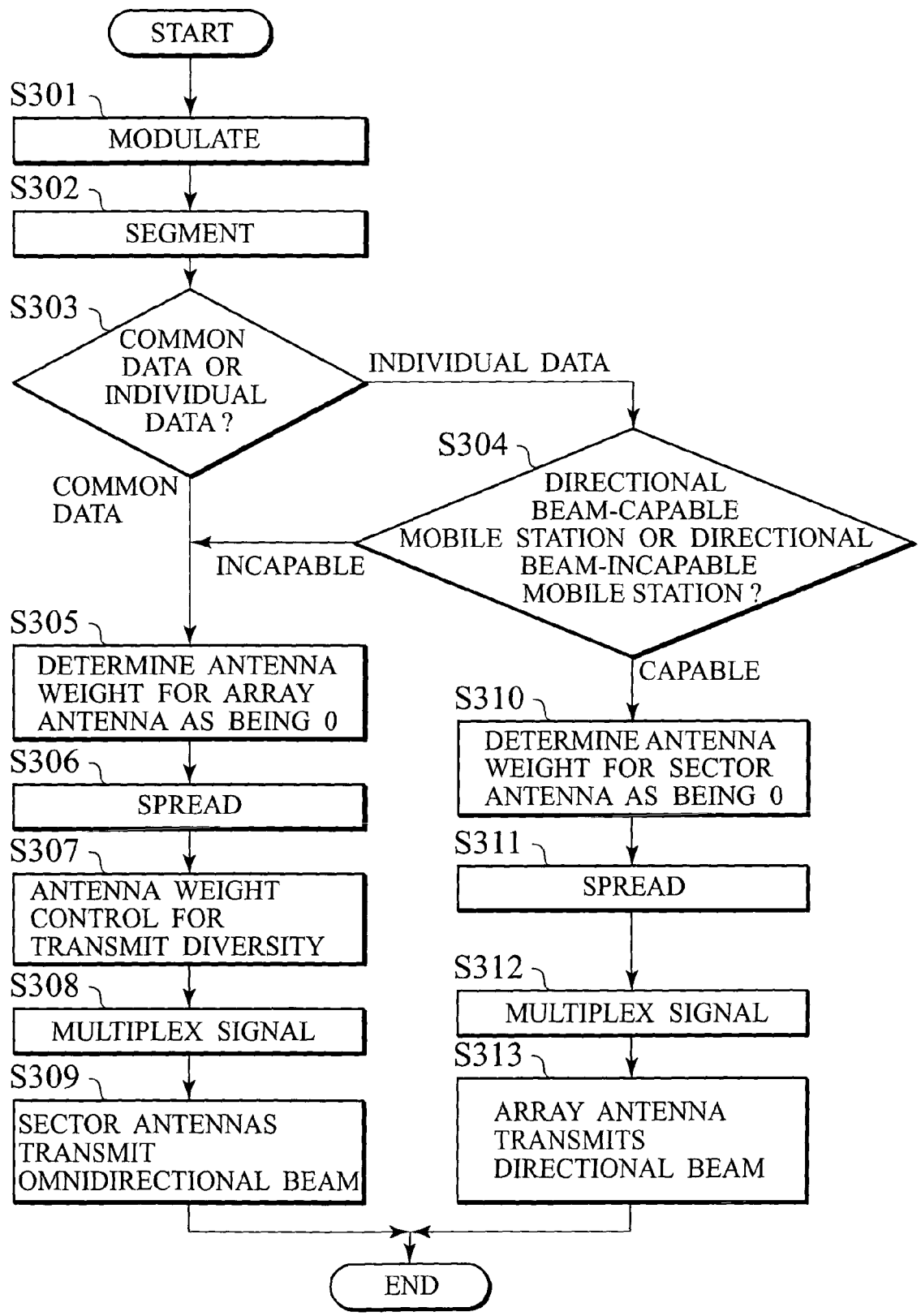
FIG. 13 is a flowchart illustrating a procedure for transmitting transmitted-data by the base station according to the second embodiment of the present invention.

Next, a communication method using the mobile communication system 200 is described using FIG. 13. Steps (S301) through (S306) are substantially the same as steps (S201) through (S206) shown in FIG. 8. Following step (S306), the transmit diversity weight controller 220 performs antenna weight control for transmit diversity to the spread signal series (S307). More specifically, to begin with, the transmit diversity weight controller 220 segments the spread signal series into the same number of signal series as that of the plurality of sector antennas 211b and 211c. The transmit diversity weight controller 220 then determines the antenna weight for transmit diversity to be multiplied for each signal series transmitted from each of the sector antennas 211b and 211c. The transmit diversity weight controller 220 then multiplies the respective signal series transmitted from the sector antennas 211b and 211c by the determined antenna weight for transmit diversity for each signal series. It should be noted that the transmit diversity weight controller 220 selects either the sector antenna 211b or the sector antenna 211c as the antenna to be used for signal transmission, in the case of transmitting signals without adopting transmit diversity. The base station 210 then determines the antenna weight for the selected sector antenna as being '1', determines the antenna weight for the sector antenna not selected as being '0', and multiplies the signal series by them.

Following step (S307), the signal multiplex unit 216 multiplexes the signal series of the transmitted-data 2a performed antenna weight control for transmit diversity (S308). The RF transmitters 217b and 217c convert the signals inputted from the signal multiplex unit 216 into radio frequency signals, and the transmission amplifiers 218 band 218c amplify them. The transmission amplifiers 218b and 218c input the amplified signals to the sector antennas 211b and 211c, respectively. Finally, since the signal series to the array antenna 211a are multiplied by the antenna weight, which has been determined as being '0' in step (S305), the sector antennas 211b and 211c transmit common data with omnidirectional beams to the mobile stations 230 through the downlink common channel adopting transmit diversity. Alternatively, the sector antennas 211b and 211c transmit individual data with omnidirectional beams to the mobile stations 230 through the downlink dedicated channel adopting transmit diversity (S309). It should be noted that the base station 210 transmits common data and individual data with omnidirectional beams, by using either the sector antenna 211b or the sector antenna 211c, in the case of transmitting signals without adopting transmit diversity.

Meanwhile, in step (S304), when the mobile station 230 that transmits individual data through the downlink dedicated channel is a directional beam-capable mobile station, the base station 210 performs steps (S310) through (S313). Steps (S310) through (S313) are substantially the same as steps (S209) through (S212) shown in FIG. 8.

According to the mobile communication system 200, the base station 210, and the communication method, the following effects may be obtained in addition to the effects obtained with the mobile communication system 100, the base station 10, and the communication method according to the first embodiment.

The base station 210 comprises a plurality of sector antennas 211b and 211c as a sector antenna for each sector. As a result, the base station 210 may adopt transmit diversity for transmitting signals to the mobile stations 230 and perform antenna diversity reception of signals from the mobile stations 230, by using the plurality of sector antennas 211b and 211c.

Furthermore, the base station 210 comprises a transmit diversity weight controller 220 that controls transmit diversity by using the plurality of sector antennas 211b and 211c. As a result, the base station 210 may improve the reception quality of signals in the mobile stations 230 transmitted from the base station 210 through the downlink.

In addition, the base station 210 comprises a combiner 221 that controls antenna diversity reception of signals from the mobile station 230. As a result, the combiner 221 may control antenna diversity reception of signals from the mobile stations 230, by using the array antenna 211a and the plurality of sector antennas 211b and 211c. Accordingly, the base station 210 may improve the reception quality of the reception signal, which is transmitted from the mobile stations 230 through the uplink, regardless of the propagation environment.

In addition, the transmit diversity weight controller 220 selects either the sector antenna 211b or the sector antenna 211c when transmitting signals without adopting transmit diversity. The transmit diversity weight controller 220 then determines the antenna weight for the selected sector antenna as being '1', and determines the antenna weight for the sector antenna not selected as being '0'. As a result, the transmit diversity weight controller 220 may easily switch between signal transmission adopting transmit diversity and signal transmission not adopting transmit diversity.

MODIFIED EXAMPLE

The present invention is not limited to the described above first and second embodiments, and various modifications are possible. The base stations 10 and 210 shown in FIG. 4 and FIG. 9 have the same antenna configuration for all of the first sector 1a through third sector 1c, but are not limited thereto. For example, the base stations 10 and 210 may have a different antenna configuration for each sector, according to the propagation environment surrounding the base stations 10 and 210 and the arranging environment of the base stations 10 and 210, array antennas, and sector antennas.

In addition, the base station 10 shown in FIG. 5 may perform antenna diversity reception of signals from the mobile stations 30 by using the array antenna 11a and the sector antenna 11b. In this case, the base station 10 must have an array antenna weight controller, an array antenna combiner, a demodulator for the array antenna 11a, and a combiner as shown in FIG. 12, in addition to the demodulator 12b for the sector antenna 11b. In addition, although not shown in FIG. 5, the base station 10 also has a RF receiver for the array antenna 11a as shown in FIG. 12, as with the base station 210.

Respective antenna elements 11l through 11n of the array antenna 11a input reception signals to the RF receiver for the array antenna 11a. The array antenna RF receiver detects the reception signals virtually synchronously, and inputs them to the array antenna weight controller. The array antenna weight controller multiplies the reception signal received by respective antenna elements 11l through 11n, by antenna weight. The array antenna combiner combines the reception signal multiplied by the antenna weight, and inputs it to the demodulator for the array antenna 11b.

The demodulator for the array antenna 11b demodulates the reception signal combined by the array antenna combiner, and inputs the demodulated data to the combiner. The demodulator 12b also inputs the demodulated data to the combiner. The combiner then multiplied demodulated data inputted from two demodulators by weights, respectively, and combines them, as with the combiner 221 shown in FIG. 12. Accordingly, the base station 10 may perform two-branch antenna diversity reception using the reception signals received by the array antenna 11a and the sector antenna 11b for demodulating data.

In addition, in FIG. 12, the base station 210 has a configuration for performing three-branch antenna diversity reception using all reception signals received by the array antenna 211a and sector antennas 211b and 211c for demodulating data, but is not limited thereto. For example, a configuration for performing two-branch antenna diversity reception is possible only where signals received by one of the sector antennas 211b and 211c and the array antenna 211a are demodulated and then combined. In this case, the base station should have two demodulators: one for array antenna and the other for one sector antenna. In addition, it may have a configuration for performing two-branch antenna diversity reception only where reception signals received by two sector antennas 211b and 211c are demodulated and then combined. In this case, the base station should have two demodulators for two sector antennas.

In this manner, the number of demodulators may be decreased, when antenna diversity reception is performed using the reception signals received by some antennas of a plurality of antennas, and antenna diversity reception is not performed using reception signals received by all the antennas. As the number of demodulators increases, the equipment scale of the base station increases. Accordingly, the number of demodulators may be reduced by using only a few antennas rather than all of the antennas, as the antennas used for antenna diversity reception. As a result, the equipment scale of the base station may be reduced. This is particularly effective when there are restrictions on the scale of a reception system configuration of the base station. It should be noted that the reception signal of an antenna that differs for each sector may be used as the reception signal of the antenna for antenna diversity reception. In other words, a configuration required for antenna diversity reception may be varied for each sector.

In addition, in the first and second embodiments, a mobile communication system adopting the three-sector configuration has been described, as an example, however, the mobile communication system, the base station, and the communication method according to the present invention may be applied to a mobile communication system adopting the six-sector configuration as shown in FIG. 3B.

What is claimed is:

1. A base station comprising:
a directional antenna configured to transmit a directional beam to a mobile station;
an omnidirectional antenna configured to transmit an omnidirectional beam to the mobile station; and
an antenna controller configured to determine whether or not the mobile station is capable of receiving the directional beam, and select the directional antenna as an antenna for transmitting individual data in a case of being capable of receiving the directional beam, or select the omnidirectional antenna as an antenna for transmitting the individual data in a case of being incapable of receiving the directional beam, wherein
the antenna controller is configured
to transmit an update instruction signal to the mobile station and to receive a signal including mobile station information from the mobile station indicating whether the mobile station is capable of receiving the directional beam or incapable of receiving the directional beam,
to store the mobile station information, and
to determine whether or not the mobile station is capable of receiving the directional beam based on the mobile station information.

2. The base station of claim 1, wherein the antenna controller determines whether transmitted-data to the mobile station is the individual data or common data, and in a case of the common data, selects the omnidirectional antenna as an antenna for transmitting the common data.

3. The base station of claim 1, further comprising a plurality of omnidirectional antennas configured to transmit omnidirectional beams to the mobile station.

4. The base station of claim 3, further comprising a transmit diversity controller configured to control transmit diversity by using the plurality of omnidirectional antennas.

5. The base station of claim 1, further comprising a diversity reception controller configured to control antenna diversity reception of signals from the mobile station.

6. A mobile communication system comprising: a mobile station; and
a base station comprising:
a directional antenna configured to transmit a directional beam to the mobile station; an omnidirectional antenna configured to transmit an omnidirectional beam to the mobile station; and
an antenna controller configured to determine whether or not the mobile station is capable of receiving the directional beam, and select the directional antenna as an antenna for transmitting individual data in a case of being capable of receiving the directional beam, or select the omnidirectional antenna as an antenna for transmitting the individual data in a case of being incapable of receiving the directional beam, wherein
the antenna controller is configured
to transmit an update instruction signal to the mobile station and to receive a signal including mobile station information from the mobile station indicating whether the mobile station is capable of receiving the directional beam or incapable of receiving the directional beam,
to store the mobile station information, and
to determine whether or not the mobile station is capable of receiving the directional beam based on the mobile station information.

7. A communication method comprising:

determining whether or not a mobile station is capable of receiving a directional beam;

selecting a directional antenna as an antenna for transmitting individual data in a case of being capable of receiving the directional beam, or an omnidirectional antenna as an antenna for transmitting the individual data in a case of being incapable of receiving the directional beam;

transmitting the individual data to the mobile station by using either the directional antenna or the omnidirectional antenna;

transmitting an update instruction signal to the mobile station and receiving a signal including mobile station information from the mobile station indicating whether the mobile station is capable of receiving a directional beam or incapable of receiving the directional beam; and storing the mobile station information, wherein said determining step includes determining whether or not the mobile station is capable of receiving the directional beam or incapable of receiving the directional beam based on the mobile station information.

* * * * *